US009213934B1

(12) United States Patent
Versteeg et al.

(10) Patent No.: US 9,213,934 B1
(45) Date of Patent: Dec. 15, 2015

(54) REAL TIME EXPLOSIVE HAZARD INFORMATION SENSING, PROCESSING, AND COMMUNICATION FOR AUTONOMOUS OPERATION

(71) Applicant: Battelle Energy Alliance, LLC, Idaho Falls, ID (US)

(72) Inventors: Roelof J. Versteeg, Hanover, NH (US); Douglas A. Few, Worthington, OH (US); Robert A. Kinoshita, Idaho Falls, ID (US); Douglas Johnson, Idaho Falls, ID (US); Ondrej Linda, Bellevue, WA (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 14/623,997

(22) Filed: Feb. 17, 2015

Related U.S. Application Data

(62) Division of application No. 13/049,788, filed on Mar. 16, 2011, now Pat. No. 8,965,578.

(51) Int. Cl.
*G05B 15/00* (2006.01)
*G05B 19/00* (2006.01)
(Continued)

(52) U.S. Cl.
CPC ............... *G06N 3/004* (2013.01); *F41H 11/13* (2013.01); *G05D 1/0088* (2013.01); *G05D 2201/0209* (2013.01)

(58) Field of Classification Search
CPC ...... G06N 3/004; F41H 11/13; G05D 1/0088; G05D 2201/0209
USPC ......... 700/245, 246, 247, 248, 249, 253, 258, 700/259, 264; 901/1, 46; 318/568.11, 318/568.12, 568.16, 568.24; 250/285, 282, 250/288, 292, 281, 290, 325, 326, 339.04, 250/343, 393, 423 R, 424; 356/73, 301, 356/5.01; 340/632; 342/159, 22, 59
See application file for complete search history.

(56) References Cited

U.S. PATENT DOCUMENTS 4,570,217 A   2/1986  Allen et al.
4,613,942 A   9/1986  Chen
(Continued)

FOREIGN PATENT DOCUMENTS

WO          0006084 A2     2/2000

OTHER PUBLICATIONS

Baptista et al., "An experimental testbed for position and force control of robotic manipulators," 1998, IEEE, p. 222-227.
(Continued)

*Primary Examiner* — Dalena Tran
*Assistant Examiner* — Jaime Figueroa
(74) *Attorney, Agent, or Firm* — TraskBritt

(57) ABSTRACT

Methods, computer readable media, and apparatuses provide robotic explosive hazard detection. A robot intelligence kernel (RIK) includes a dynamic autonomy structure with two or more autonomy levels between operator intervention and robot initiative A mine sensor and processing module (ESPM) operating separately from the RIK perceives environmental variables indicative of a mine using subsurface perceptors. The ESPM processes mine information to determine a likelihood of a presence of a mine. A robot can autonomously modify behavior responsive to an indication of a detected mine. The behavior is modified between detection of mines, detailed scanning and characterization of the mine, developing mine indication parameters, and resuming detection. Real time messages are passed between the RIK and the ESPM. A combination of ESPM bound messages and RIK bound messages cause the robot platform to switch between modes including a calibration mode, the mine detection mode, and the mine characterization mode.

20 Claims, 18 Drawing Sheets

(51) Int. Cl.
   *G06N 3/00*    (2006.01)
   *F41H 11/13*   (2011.01)
   *G05D 1/00*    (2006.01)

(56) References Cited

U.S. PATENT DOCUMENTS

| | | | |
|---|---|---|---|
| 4,786,847 A | 11/1988 | Daggett et al. |
| 4,846,576 A | 7/1989 | Maruyama et al. |
| 4,870,561 A | 9/1989 | Love et al. |
| 4,967,862 A | 11/1990 | Pong et al. |
| 5,111,401 A | 5/1992 | Everett et al. |
| 5,247,608 A | 9/1993 | Flemming et al. |
| 5,286,973 A | 2/1994 | Westrom et al. |
| 5,347,459 A | 9/1994 | Greenspan et al. |
| 5,371,854 A | 12/1994 | Kramer |
| 5,509,090 A | 4/1996 | Maruyama et al. |
| 5,511,147 A | 4/1996 | Abdel-Malek |
| 5,521,843 A | 5/1996 | Hashima et al. |
| 5,561,742 A | 10/1996 | Terada et al. |
| 5,586,199 A | 12/1996 | Kanda et al. |
| 5,590,062 A | 12/1996 | Nagamitsu et al. |
| 5,617,335 A | 4/1997 | Hashima et al. |
| 5,675,229 A | 10/1997 | Thorne |
| 5,684,531 A | 11/1997 | Li et al. |
| 5,684,695 A | 11/1997 | Bauer |
| 5,705,906 A | 1/1998 | Tanabe et al. |
| 5,721,691 A | 2/1998 | Wuller et al. |
| 5,838,562 A | 11/1998 | Gudat et al. |
| 5,867,800 A | 2/1999 | Leif |
| 5,870,494 A | 2/1999 | Kanda et al. |
| 5,913,919 A | 6/1999 | Bauer et al. |
| 5,936,240 A | 8/1999 | Dudar et al. |
| 5,937,143 A | 8/1999 | Watanabe et al. |
| 5,949,683 A | 9/1999 | Akami et al. |
| 5,987,379 A | 11/1999 | Smith |
| 6,055,042 A | 4/2000 | Sarangapani |
| 6,061,709 A | 5/2000 | Bronte |
| 6,078,255 A | 6/2000 | Dividock et al. |
| 6,157,864 A | 12/2000 | Schwenke et al. |
| 6,160,371 A | 12/2000 | Tachikawa |
| 6,163,252 A | 12/2000 | Nishiwaki |
| 6,167,328 A | 12/2000 | Takaoka et al. |
| 6,205,380 B1 | 3/2001 | Bauer et al. |
| 6,212,574 B1 | 4/2001 | O'Rourke et al. |
| 6,314,341 B1 | 11/2001 | Kanayama |
| 6,332,102 B1 | 12/2001 | Nakajima et al. |
| 6,476,354 B1 | 11/2002 | Jank et al. |
| 6,496,755 B2 | 12/2002 | Wallach et al. |
| 6,516,236 B1 | 2/2003 | Brown et al. |
| 6,522,288 B1 | 2/2003 | Paradie et al. |
| 6,535,793 B2 | 3/2003 | Allard |
| 6,581,048 B1 | 6/2003 | Werbos |
| 6,598,169 B1 | 7/2003 | Warwick et al. |
| 6,618,767 B1 | 9/2003 | Slaughter et al. |
| 6,681,150 B1 | 1/2004 | Haga et al. |
| 6,697,147 B2 | 2/2004 | Ko et al. |
| 6,721,462 B2 | 4/2004 | Okabayashi et al. |
| 6,760,645 B2 | 7/2004 | Kaplan et al. |
| 6,760,648 B2 | 7/2004 | Sakamoto et al. |
| 6,768,944 B2 | 7/2004 | Breed et al. |
| 6,782,306 B2 | 8/2004 | Yutkowitz |
| 6,785,590 B2 | 8/2004 | Kasuga et al. |
| 6,799,100 B2 | 9/2004 | Burns et al. |
| 6,804,580 B1 | 10/2004 | Stoddard et al. |
| 6,809,490 B2 | 10/2004 | Jones et al. |
| 6,816,753 B2 | 11/2004 | Sakamoto et al. |
| 6,836,701 B2 | 12/2004 | McKee |
| 6,845,297 B2 | 1/2005 | Allard |
| 6,865,429 B1 | 3/2005 | Schneider et al. |
| 6,883,201 B2 | 4/2005 | Jones et al. |
| 6,889,118 B2 | 5/2005 | Murray et al. |
| 6,917,893 B2 | 7/2005 | Dietsch et al. |
| 6,922,632 B2 | 7/2005 | Foxlin |
| 6,925,357 B2 | 8/2005 | Wang et al. |
| 6,941,543 B1 | 9/2005 | Brown et al. |
| 6,974,082 B2 | 12/2005 | Mackey |
| 7,024,278 B2 | 4/2006 | Chiappetta et al. |
| 7,069,113 B2 | 6/2006 | Matsuoka et al. |
| 7,069,124 B1 | 6/2006 | Whittaker et al. |
| 7,085,637 B2 | 8/2006 | Breed et al. |
| 7,151,848 B1 | 12/2006 | Watanabe et al. |
| 7,162,056 B2 | 1/2007 | Burl et al. |
| 7,164,971 B2 | 1/2007 | Ferla et al. |
| 7,170,252 B2 | 1/2007 | Maeki |
| 7,211,980 B1 | 5/2007 | Bruemmer et al. |
| 7,236,854 B2 | 6/2007 | Pretlove et al. |
| 7,343,222 B2 | 3/2008 | Solomon |
| 7,343,232 B2 | 3/2008 | Duggan et al. |
| 7,429,843 B2 | 9/2008 | Jones et al. |
| 7,450,127 B2 | 11/2008 | Hong et al. |
| 7,801,644 B2 | 9/2010 | Bruemmer et al. |
| 7,925,381 B2 | 4/2011 | Murray et al. |
| 8,271,132 B2 | 9/2012 | Nielsen et al. |
| 8,355,818 B2 | 1/2013 | Nielsen et al. |
| 2002/0091466 A1 | 7/2002 | Song et al. |
| 2002/0120362 A1 | 8/2002 | Lathan et al. |
| 2002/0137557 A1 | 9/2002 | Ishii et al. |
| 2002/0165028 A1 | 11/2002 | Miyamoto et al. |
| 2003/0033050 A1 | 2/2003 | Yutkowitz |
| 2003/0055654 A1 | 3/2003 | Oudeyer |
| 2003/0101151 A1 | 5/2003 | Holland |
| 2003/0144774 A1 | 7/2003 | Trissel et al. |
| 2003/0171846 A1 | 9/2003 | Murray, IV et al. |
| 2003/0191559 A1 | 10/2003 | Chatsinchai et al. |
| 2003/0216834 A1 | 11/2003 | Allard |
| 2004/0019406 A1 | 1/2004 | Wang et al. |
| 2004/0066500 A1 | 4/2004 | Gokturk et al. |
| 2004/0073360 A1 | 4/2004 | Foxlin |
| 2004/0133316 A1 | 7/2004 | Dean |
| 2004/0138959 A1 | 7/2004 | Hlavac et al. |
| 2004/0158355 A1 | 8/2004 | Holmqvist et al. |
| 2004/0167670 A1 | 8/2004 | Goncalves et al. |
| 2004/0168148 A1 | 8/2004 | Goncalves et al. |
| 2004/0170302 A1 | 9/2004 | Museth et al. |
| 2004/0175680 A1 | 9/2004 | Hlavac et al. |
| 2004/0189702 A1 | 9/2004 | Hlavac et al. |
| 2004/0193321 A1 | 9/2004 | Anfindsen et al. |
| 2004/0199290 A1 | 10/2004 | Stoddard et al. |
| 2004/0210847 A1 | 10/2004 | Berson et al. |
| 2005/0004723 A1 | 1/2005 | Duggan et al. |
| 2005/0007603 A1 | 1/2005 | Arieli et al. |
| 2005/0021186 A1 | 1/2005 | Murray et al. |
| 2005/0149231 A1 | 7/2005 | Pretlove et al. |
| 2005/0182518 A1 | 8/2005 | Karlsson |
| 2005/0197739 A1 | 9/2005 | Noda et al. |
| 2005/0204438 A1 | 9/2005 | Wang et al. |
| 2005/0234592 A1 | 10/2005 | McGee et al. |
| 2005/0234679 A1 | 10/2005 | Karlsson |
| 2006/0015215 A1 | 1/2006 | Howard et al. |
| 2006/0031429 A1 | 2/2006 | Ayyagari |
| 2006/0095160 A1 | 5/2006 | Orita et al. |
| 2006/0117324 A1 | 6/2006 | Alsafadi et al. |
| 2006/0178777 A1 | 8/2006 | Park et al. |
| 2006/0241827 A1 | 10/2006 | Fukuchi et al. |
| 2007/0093940 A1 | 4/2007 | Ng-Thow-Hing et al. |
| 2007/0135962 A1 | 6/2007 | Kawabe et al. |
| 2007/0143345 A1 | 6/2007 | Jones et al. |
| 2007/0156286 A1* | 7/2007 | Yamauchi ............ G05D 1/0038 700/245 |
| 2007/0197877 A1 | 8/2007 | Decorte et al. |
| 2007/0198145 A1 | 8/2007 | Norris et al. |
| 2007/0208442 A1* | 9/2007 | Perrone ................ G05D 1/0088 700/95 |
| 2007/0260394 A1 | 11/2007 | Dean |
| 2007/0271002 A1 | 11/2007 | Hoskinson et al. |
| 2008/0009964 A1 | 1/2008 | Bruemmer et al. |
| 2008/0009965 A1 | 1/2008 | Bruemmer et al. |
| 2008/0009966 A1 | 1/2008 | Bruemmer et al. |
| 2008/0009967 A1 | 1/2008 | Bruemmer |
| 2008/0009968 A1 | 1/2008 | Bruemmer et al. |
| 2008/0009969 A1 | 1/2008 | Bruemmer et al. |
| 2008/0009970 A1 | 1/2008 | Bruemmer |
| 2008/0049217 A1* | 2/2008 | Cappelletti .......... A01D 34/008 356/141.3 |

(56) References Cited

U.S. PATENT DOCUMENTS

| | | | |
|---|---|---|---|
| 2008/0071423 A1 | 3/2008 | Murray et al. | |
| 2008/0294288 A1 | 11/2008 | Yamauchi | |
| 2009/0043439 A1* | 2/2009 | Barfoot | G05D 1/0297 701/25 |
| 2010/0234989 A1* | 9/2010 | Baier | B25J 9/0093 700/245 |
| 2011/0054689 A1 | 3/2011 | Nielsen et al. | |

OTHER PUBLICATIONS

Baptista et al., "An open architecture for position and force control of robotic manipulators," 1998, IEEE, p. 471-474, vol. 2.

Barber et al., "A Communication Protocol Supporting Dynamic Autonomy Agreements in Multi-agent Systems," 2001, Internet, p. 1-18.

Bruemmer et al., "Autonomous Robot System for Sensor Characterization," 10th International Conference on Robotics and Remote Systems for Hazardous Environments, Mar. 1, 2004, pp. 1-6.

Bruemmer et al., "Shared Understanding for Collaborative Control," IEEE Transactions on Systems, Man, and Cybernetics—Part A: Systems and Humans, vol. 35, No. 4, Jul. 2005.

Bualat et al., "Developing an Autonomy Infusion Infrastructure for Robotic Exploration," 2004 IEEE Aerospace Conference Proceedings, Jun. 2004, pp. 849-860.

Buttazzo et al., "Robot control in hard real-time environment," 1997, IEEE, p. 152-159.

Fernandez-Madrigal et al., "Adaptable Web Interfaces for Networked Robots," University of Malaga, Spain., 6 pages (Aug. 2005).

Few, et al., "Semi Autonomous Mine Detection System," INL/CON-10-17918, SPIE Defense Security and Sensing, Orlando, FL, Apr. 2010, 12 pages.

Herman et al., "Modular Countermine Payload for Small Robots," INL/CON-10-17962, SPIE Defense Security and Sensing, Orlando, FL, Apr. 2010, 10 pages.

Iberall et al., "Control philosophy and simulation of a robotic hand as a model for prosthetic hands," 1993, IEEE, p. 824-831.

Idaho National Laboratory, Dynamic Autonomy Collaborative Cognitive Workspace, 2002, Internet, p. 1-3.

Idaho National Laboratory, Dynamic Autonomy Real-Time Human-Robot Interaction Issues, Internet, 2002.

Idaho National Laboratory, Teleoperation, 2002, Internet, p. 1-2.

Idasiak et al., "A predictive real-time software for robotic application," 1995, IEEE, p. 3994-3999 vol. 5.

Jennings et al., Cooperative Robot Localization with Vision-Based Mapping, 1998, Internet, p. 1-7.

Laschi et al., "Adaptable Semi-Autonomy in Personal Robots," IEEE International Workshop on Robot and Human Interactive Communication, 2001, pp. 152-157.

Montano et al., "Active sensing using proximity sensors for object recognition and localization," 1991, IEEE, p. 49-54.

Munich et al., "ERSP: A Software Platform and Architecture for the Service Robotics Industry," IEEE, Aug 2-6, 2005, pp. 460-467.

PCT International Search Report and Written Opinion of the International Searching Authority for PCT/US09/36685, dated Nov. 2, 2009, 9 pages.

Piaggio et al., "ETHNOS-II, A Programming Environment for Distributed Multiple Robotic Systems," IEEE Mar. 1999, pp. 1-10.

Teng et al., "A HAL for Component-based Embedded Operating Systems," IEEE Proceedings of the 29th Annual International Computer Software and Applications Conference, 2005, 2 pages.

Thompson, Colleen, "Robots as Team Members? Why, yes, and the Idaho lab is finding them to be as effective as bomb-sniffing dogs," Innovation: America's Journal of Technology Commercialization, Jun.-Jul. 2007, pp. 20-21.

Thrun, "Leaning Occupancy Grids with Forward Models," 2001, IEEE, pp. 1676-1681, vol. 3.

Volpe et al., "The CLARAty Architecture for Robotic Autonomy," Jet Propulsion Laboratory, California Institute of Technology, Pasadena, California, IEEE, Feb. 2001, pp. 1-121 to 1-132.

Yamauchi, Brian, "The Wayfarer modular navigation payload for intelligent robot infrastructure," iRobot Research Group, Burlington, MA, (May 2005) 12 pages.

Yoo et al., "Introduction to Hardware Abstraction Layers for SoC," IEEE Proceedings of the Design, Automation and Test in Europe conference and Exhibition, 2003, 2 pages.

* cited by examiner

270

Cognitive Glue:
blends & orchestrates asynchronous firings from reactive & deliberate behaviors below GoTo: guarded motion, obstacle avoidance, get-unstuck reactive & deliberate path plan waypoint navigation
272

Human detection & pursuit: 274
occupancy change detection, laser tracking, visual tracking, path planning, obstacle avoidance 276
Exploration / Reconnaissance (map building)

278
Leader / Follower

280
Search & Identify

*FIG. 9*

| Autonomy Mode | Defines Task Goals | Supervises Direction | Motivates Motion | Prevents Collision |
|---|---|---|---|---|
| Teleoperation mode 293 | Operator | Operator | Operator | Operator |
| Safe Mode 294 | Operator | Operator | Operator | Robot |
| Shared Mode 295 | Operator | Operator | Robot | Robot |
| Collaborative Tasking Mode 296 | Operator | Robot | Robot | Robot |
| Autonomous Mode 297 | Robot | Robot | Robot | Robot |

REAL TIME EXPLOSIVE HAZARD INFORMATION SENSING, PROCESSING, AND COMMUNICATION FOR AUTONOMOUS OPERATION

CROSS-REFERENCE TO RELATED APPLICATIONS

This application is a divisional of U.S. patent application Ser. No. 13/049,788, filed Mar. 16, 2011, pending, the disclosure of which is hereby incorporated herein in its entirety by this reference.

This application is also related to: U.S. patent application Ser. No. 11/428,637, filed Jul. 5, 2006, now U.S. Pat. No. 7,587,260, issued Sep. 8, 2009; U.S. patent application Ser. No. 11/428,650, filed Jul. 5, 2006, now U.S. Pat. No. 7,620,477, issued Nov. 17, 2009; U.S. patent application Ser. No. 11/428,743, filed Jul. 5, 2006, now U.S. Pat. No. 7,211,980, issued May 1, 2007; U.S. patent application Ser. No. 11/428,621, filed Jul. 5, 2006, now U.S. Pat. No. 7,974,738, issued Jul. 5, 2011; U.S. patent application Ser. No. 11/428,646, filed Jul. 5, 2006, now U.S. Pat. No. 7,584,020, issued Sep. 1, 2009; U.S. patent application Ser. No. 11/428,729, filed Jul. 5, 2006, now U.S. Pat. No. 7,801,644, issued Sep. 21, 2010; U.S. patent application Ser. No. 11/428,769, filed Jul. 5, 2006, now U.S. Pat. No. 7,668,621, issued Feb. 23, 2010; U.S. patent application Ser. No. 11/428,757 filed Jul. 5, 2006, now U.S. Pat. No. 8,073,564, issued Dec. 6, 2011; U.S. patent application Ser. No. 12/048,110, filed Mar. 13, 2008, now U.S. Pat. No. 8,271,132, issued Sep. 18, 2012; U.S. patent application Ser. No. 12/553,794, filed Sep. 3, 2009, now U.S. Pat. No. 8,355,818, issued Jan. 15, 2013, the disclosure of each of which is hereby incorporated herein in its entirety by this reference.

CONTRACTUAL ORIGIN

This invention was made with government support under Contract No. DE-AC07-05ID14517 awarded by the United States Department of Energy. The government has certain rights in the invention.

TECHNICAL FIELD

Embodiments of the disclosure discussed herein relate generally to robotics and, more specifically, to robotic detection of explosive hazards with various levels of robot autonomy.

BACKGROUND

Historically, robot behaviors have been created for specific tasks and applications. These behaviors have generally been reinvented time and again for different robots and different applications. There has been no sustained attempt to provide a kernel of basic robot competence and decision making that can be used to bootstrap development across many different applications.

Some architectures have been proposed that provide a generic application programming interface (API) for querying various sensors and commanding various actuators; however, many of these architectures have been limited to raw inputs and outputs rather than provide the intelligence and behavior to a robot. As a result, the behavior functionality created for one robot may not be easily ported to new robots. Other architectures have been proposed to allow limited behaviors to port across different robot platforms, but these have generally been limited to specific low-level control systems.

The problem with robots today is that they are not very bright. Current robot "intelligence" is really just a grab-bag of programmed behaviors to keep mobile robots from doing pointless things, like getting stuck in corners or running into obstacles. The promise of wireless robots is that they can be sent into remote situations that are too difficult or dangerous for humans. The reality is that today's robots generally lack the ability to make any decisions on their own and rely on continuous guidance by human operators watching live video from on-board cameras.

Most commercial robots operate on a master/slave principle. A human operator completely controls the movement of the robot from a remote location using robot-based sensors such as video and Global Positioning System (GPS). This setup often requires more than one operator per robot to navigate around obstacles and achieve a goal. As a result, very skilled operators may be necessary to reliably direct the robot. Furthermore, the intense concentration needed for controlling the robot can detract from achieving mission goals.

Although it has been recognized that there is a need for adjustable autonomy, robot architectures currently do not exist that provide a foundation of autonomy levels upon which to build intelligent robotic capabilities. Furthermore, robot architectures do not currently exist that provide a foundation of generic robot attributes for porting to a variety of robot platforms.

Payloads for small robotic platforms have historically been designed and implemented as platform and task-specific solutions. A consequence of this approach is that payloads cannot be deployed on different robotic platforms without substantial re-engineering efforts.

Mine detection using robots has conventionally been performed in a teleoperation mode where a remote user controls most, if not all of the behaviors of the robot including locomotion and control of mine sensing equipment on the robot. This process can be inefficient and prone to errors due to the constant and high interaction between the robot and the remote user.

Therefore, there is a need for a robot intelligence kernel that provides a framework of dynamic autonomy that is easily portable to a variety of robot platforms and is configured to provide information processing and communication capabilities to address quality of data needs for an explosive hazard detection system and safety needs of a robot to be met.

BRIEF SUMMARY

Embodiments of the present disclosure include methods, computer readable media, and apparatuses to enable both quality of data needs for an explosive hazard detection system and safety needs of a robot to be met in an environment where the two systems often have different perspectives on the same problem.

In some embodiments, the present disclosure includes a method of explosive hazard detection including providing a robot intelligence kernel (RIK) including a dynamic autonomy structure with two or more autonomy levels between operator intervention in a teleoperation mode and robot initiative in an autonomous mode and for controlling operation of one or more locomotors and one or more subsurface perceptors. An explosive hazard sensor and processing module (ESPM) operating separately from the RIK is provided for perceiving environmental variables indicative of a presence of an explosive hazard using the one or more subsurface perceptors. The ESPM is also provided for processing information from the perceiving to determine a likelihood of a presence of the explosive hazard and communicating with the RIK to exchange information and commands. The method also includes autonomously modifying behavior of the robot, responsive to an indication of a detected explosive hazard from the ESPM. The behavior is modified between detection of explosive hazards as part of achievement of a goal assigned by the operator, detailed scanning and characterization of the detected explosive hazard by adjusting operation of the one or more locomotors and the one or more subsurface perceptors, processing sensed information to develop explosive hazard indication parameters, and resuming the detection of explosive hazards after the detailed scanning and characterization.

In some embodiments, the present disclosure includes a robot platform comprising one or more subsurface perceptors configured for perceiving environmental variables indicative of a presence of an explosive hazard, one or more locomotors configured for providing mobility to the robot platform, and one or more controllers. The one or more controllers are configured for executing a RIK including a dynamic autonomy structure with two or more autonomy levels between operator intervention in a teleoperation mode and robot initiative in an autonomous mode. The RIK is also configured for controlling operation of the one or more locomotors and the one or more subsurface perceptors. An ESPM, operating separately from the RIK, is configured for perceiving environmental variables indicative of a presence of the explosive hazard using the one or more subsurface perceptors, processing information from the perceiving to determine a likelihood of a presence of the explosive hazard, and communicating with the RIK to exchange information and commands. The one or more controllers are also configured to cause autonomous behavior modifications of the robot platform responsive to an indication of a detected explosive hazard from the ESPM. The behavior is modified between detection of explosive hazards as part of achievement of a goal assigned by the operator, detailed scanning and characterization of the detected explosive hazard by adjusting operation of the one or more locomotors and the one or more subsurface perceptors, processing sensed information to develop explosive hazard indication parameters, and resuming the detection of explosive hazards after the detailed scanning and characterization.

In other embodiments, the present disclosure includes a method of communicating real time messages between a RIK and a ESPM by sending ESPM bound messages from the RIK to the ESPM to set parameters of the ESPM, request operations to be performed by the ESPM, and acknowledge at least some messages from the RIK. The method also includes sending RIK bound messages from the ESPM to the RIK to request operations to be performed by the RIK, send explosive hazard information, and acknowledge at least some messages from the ESPM. A combination of the ESPM bound messages and the RIK bound messages cause a robot platform to perform explosive hazard detection by switching between modes comprising a calibration mode for calibrating one or more subsurface perceptors, and an explosive hazard detection mode for operating one or more locomotors and one or more subsurface perceptors in a detection configuration to determine an indication of an explosive hazard. The modes also include an explosive hazard characterization mode for real time processing of detailed explosive hazard information responsive to the indication of an explosive hazard by operating the one or more locomotors and the one or more subsurface perceptors in a characterization configuration to develop the detailed explosive hazard information.

In other embodiments, the present disclosure includes a robot platform for communicating real time messages between a RIK and a ESPM. The robot platform includes one or more subsurface perceptors configured for perceiving environmental variables indicative of a presence of an explosive hazard, one or more locomotors configured for providing mobility to the robot platform, and one or more controllers. The one or more controllers are configured for sending ESPM bound messages from the RIK to the ESPM to set parameters of the ESPM, request operations to be performed by the ESPM, and acknowledge at least some messages from the RIK. The one or more controllers are also configured for sending RIK bound messages from the ESPM to the RIK to request operations to be performed by the RIK, send explosive hazard information, and acknowledge at least some messages from the ESPM. A combination of the ESPM bound messages and the RIK bound messages cause the robot platform to perform explosive hazard detection by switching between modes comprising a calibration mode for calibrating the one or more subsurface perceptors and an explosive hazard detection mode for operating the one or more locomotors and the one or more subsurface perceptors in a detection configuration to determine an indication of an explosive hazard. The modes also include an explosive hazard characterization mode for real time processing of detailed explosive hazard information responsive to the indication of an explosive hazard by operating the one or more locomotors and the one or more subsurface perceptors in a characterization configuration to develop the detailed explosive hazard information.

In still other embodiments, the present disclosure includes computer readable media including computer executable instructions, which when executed on a processor provide communication of real time messages between RIK and a ESPM. The computer executable instructions are configured to cause the processor to send ESPM bound messages from the RIK to the ESPM to set parameters of the ESPM, request operations to be performed by the ESPM, and acknowledge at least some messages from the RIK. The computer executable instructions are also configured to cause the processor to send RIK bound messages from the ESPM to the RIK to request operations to be performed by the RIK, send explosive hazard information, and acknowledge at least some messages from the ESPM. A combination of the ESPM bound messages and the RIK bound messages cause a robot platform to perform explosive hazard detection by switching between modes comprising a calibration mode for calibrating one or more subsurface perceptors and an explosive hazard detection mode for operating one or more locomotors and the one or more subsurface perceptors in a detection configuration to determine an indication of an explosive hazard. The modes also include an explosive hazard characterization mode for real time processing of detailed explosive hazard information responsive to the indication of an explosive hazard by operating the one or more locomotors and the one or more subsurface perceptors in a characterization configuration to develop the detailed explosive hazard information.

BRIEF DESCRIPTION OF THE DRAWINGS

In the drawings, which illustrate what is currently considered to be the best mode for carrying out the disclosure:

FIG. 9 illustrates representative cognitive conduct components that may be available on robot platforms;

DETAILED DESCRIPTION

Figure 1:
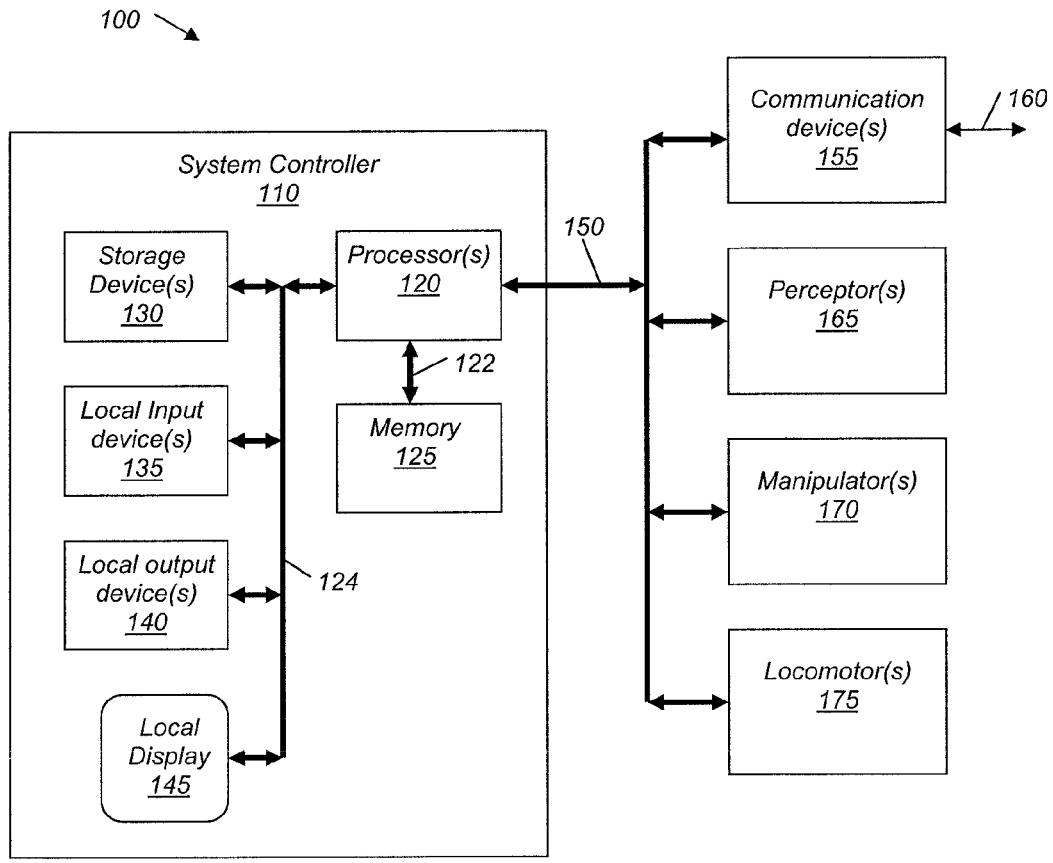
FIG. 1 illustrates a representative robot platform embodiment of the present disclosure.

The present disclosure provides methods and apparatuses for a robot intelligence kernel that provides a framework of dynamic autonomy that is easily portable to a variety of robot platforms and is configured to control a robot at a variety of interaction levels and across a diverse range of robot behaviors.

In accordance with common practice the various features illustrated in the drawings may not be drawn to scale. The illustrations presented herein are not meant to be actual views of any particular method, device, or system, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Those of ordinary skill in the art would understand that information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

Those of ordinary skill would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system.

Circuits and functions may be shown in block diagram form in order not to obscure the present disclosure in unnecessary detail. Conversely, specific circuit implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations, and the like, have been omitted where such details are not necessary to obtain a complete understanding of the present disclosure and are within the abilities of persons of ordinary skill in the relevant art. Skilled artisans may implement the described functionality in varying ways for each particular application, but such implementation decisions should not be interpreted as causing a departure from the scope of the embodiments of the disclosure described herein.

In addition, it is noted that embodiments discussed herein may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. The methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another. The instructions may be executed on a computer, processor, controller, or other suitable apparatus for carrying out the instructions.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Headings are included herein to aid in locating certain sections of detailed description. These headings should not be considered to limit the scope of the concepts described under any specific heading. Furthermore, concepts described in any specific heading are generally applicable in other sections throughout the entire specification.

Details described in sections 1 through 4 include details of a hardware environment, a generic robot architecture, a robot intelligence kernel, and some representative behaviors and conduct that may be used in embodiments of the present disclosure. Additional details may be found in U.S. Pat. No. 7,801,644 entitled "Generic Robot Architecture" to Brummer et al., the contents of which is hereby incorporated by reference in its entirety. A person of ordinary skill in the art will understand that embodiments of the present disclosure may be practiced with other unmanned autonomous vehicles and software architectures that can accommodate operation of embodiments of the present disclosure.

Section 5 describes details of the real time geophysical information sensing, processing and communication for unmanned autonomous vehicles according to embodiments of the present disclosure.

Hardware Environment

FIG. 1 illustrates a representative robot platform 100 (which may also be referred to herein as a robot system) including the present disclosure. A robot platform 100 may include a system controller 110 including a system bus 150 for operable coupling to one or more communication devices 155 operably coupled to one or more communication channels 160, one or more perceptors 165, one or more manipulators 170, and one or more locomotors 175.

The system controller 110 may include a processor 120 operably coupled to other system devices by internal buses (122, 124). By way of example and not limitation, the processor 120 may be coupled to a memory 125 through a memory bus 122. The system controller 110 may also include an internal bus 124 for coupling the processor 120 to various other devices, such as storage devices 130, local input devices 135, local output devices 140, and local displays 145.

Local output devices 140 may be devices such as speakers, status lights, and the like. Local input devices 135 may be devices such as keyboards, mice, joysticks, switches, and the like.

Local displays 145 may be as simple as light-emitting diodes indicating status of functions of interest on the robot platform 100, or may be as complex as a high-resolution display terminal.

The communication channels 160 may be adaptable to both wired and wireless communication, as well as supporting various communication protocols. By way of example and not limitation, the communication channels may be configured as a serial or parallel communication channel, such as, for example, USB, IEEE-1394, 802.11 a/b/g, cellular telephone, and other wired and wireless communication protocols.

The perceptors 165 may include inertial sensors, thermal sensors, tactile sensors, compasses, range sensors, sonar perceptors, Global Positioning System (GPS), Ground Penetrating Radar (GPR), lasers for object detection and range sensing, imaging devices, and the like. Furthermore, those of ordinary skill in the art will understand that many of these sensors may include a generator and a sensor to combine sensor inputs into meaningful, actionable perceptions. For example, sonar perceptors and GPR may generate sound waves or sub-sonic waves and sense reflected waves. Similarly, perceptors including lasers may include sensors configured for detecting reflected waves from the lasers for determining interruptions or phase shifts in the laser beam.

Imaging devices may be any suitable device for capturing images, such as, for example, an infrared imager, a video camera, a still camera, a digital camera, a Complementary Metal Oxide Semiconductor (CMOS) imaging device, a charge-coupled device (CCD) imager, and the like. In addition, the imaging device may include optical devices for modifying the image to be captured, such as, for example, lenses, collimators, filters, and mirrors. For adjusting the direction at which the imaging device is oriented, a robot platform 100 may also include pan and tilt mechanisms coupled to the imaging device. Furthermore, a robot platform 100 may include a single imaging device or multiple imaging devices.

The manipulators 170 may include vacuum devices, magnetic pickup devices, arm manipulators, scoops, grippers, camera pan and tilt manipulators, and the like.

The locomotors 175 may include one or more wheels, tracks, legs, rollers, propellers, and the like. For providing the locomotive power and steering capabilities, the locomotors 175 may be driven by motors, actuators, levers, relays and the like. Furthermore, perceptors 165 may be configured in conjunction with the locomotors 175, such as, for example, odometers and pedometers.

Figure 2:
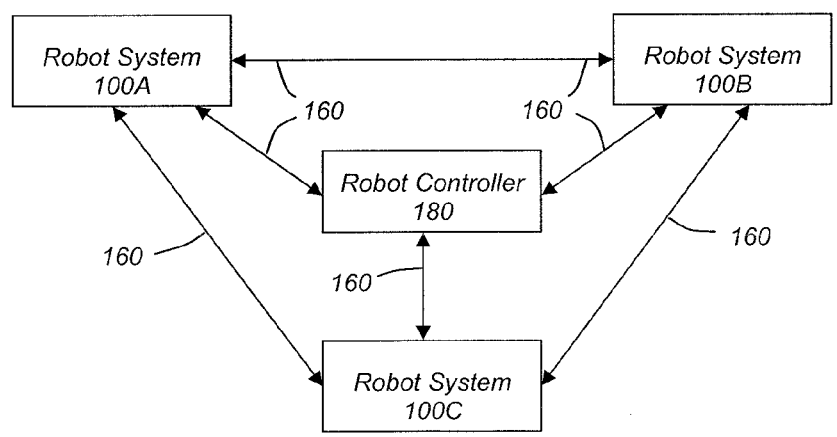
FIG. 2 illustrates a representative robot control environment including a plurality of robot platforms and a robot controller.

FIG. 2 illustrates a representative robot control environment including a plurality of robot platforms (100A, 100B, and 100C) and a robot controller 180. The robot controller 180 may be a remote computer executing a software interface from which an operator may control one or more robot platforms (100A, 100B, and 100C) individually or in cooperation. The robot controller 180 may communicate with the robot platforms (100A, 1001, and 100C), and the robot platforms (100A, 100B, and 100C) may communicate with each other, across the communication channels 160. While FIG. 2 illustrates one robot controller 180 and three robot platforms (100A, 100B, and 100C) those of ordinary skill in the art will recognize that a robot control environment may include one or more robot platforms 100 and one or more robot controllers 180. In addition, the robot controller 180 may be a version of a robot platform 100.

Software processes illustrated herein are intended to illustrate representative processes that may be performed by the robot platform 100 or robot controller 180. Unless specified otherwise, the order in which the processes are described is not intended to be construed as a limitation. Furthermore, the processes may be implemented in any suitable hardware, software, firmware, or combinations thereof. By way of example, software processes may be stored on the storage device 130, transferred to the memory 125 for execution, and executed by the processor 120.

When executed as firmware or software, the instructions for performing the processes may be stored on a computer readable medium (i.e., storage device 130). A computer readable medium includes, but is not limited to, magnetic and optical storage devices such as disk drives, magnetic tape, CDs (compact discs), DVDs (digital versatile discs or digital video discs), and semiconductor devices such as RAM (Random Access Memory), DRAM (Dynamic Random Access Memory), ROM (Read-Only Memory), EPROM (Erasable Programmable Read-Only Memory), and Flash memory.

Generic Robot Abstraction Architecture

Conventionally, robot architectures have been defined for individual robots and generally must be rewritten or modified to work with different sensor suites and robot platforms. This means that adapting the behavior functionality created for one robot platform to a different robot platform is problematic. Furthermore, even architectures that propose a hardware abstraction layer to create a framework for accepting various hardware components still may not create a robot abstraction layer wherein the abstractions presented for high-level behavioral programming are in terms of actionable components or generic robot attributes rather than the hardware present on the robot.

A notable aspect of the present disclosure is that it collates the sensor data issued from hardware or other robotic architectures into actionable information in the form of generic precepts. Embodiments of the present disclosure may include a generic robot architecture (GRA), which comprises an extensible, low-level framework, which can be applied across a variety of different robot hardware platforms, perceptor suites, and low-level proprietary control application programming interfaces (APIs). By way of example, some of these APIs may be Mobility, Aria, Aware, Player, etc.

Figure 3:
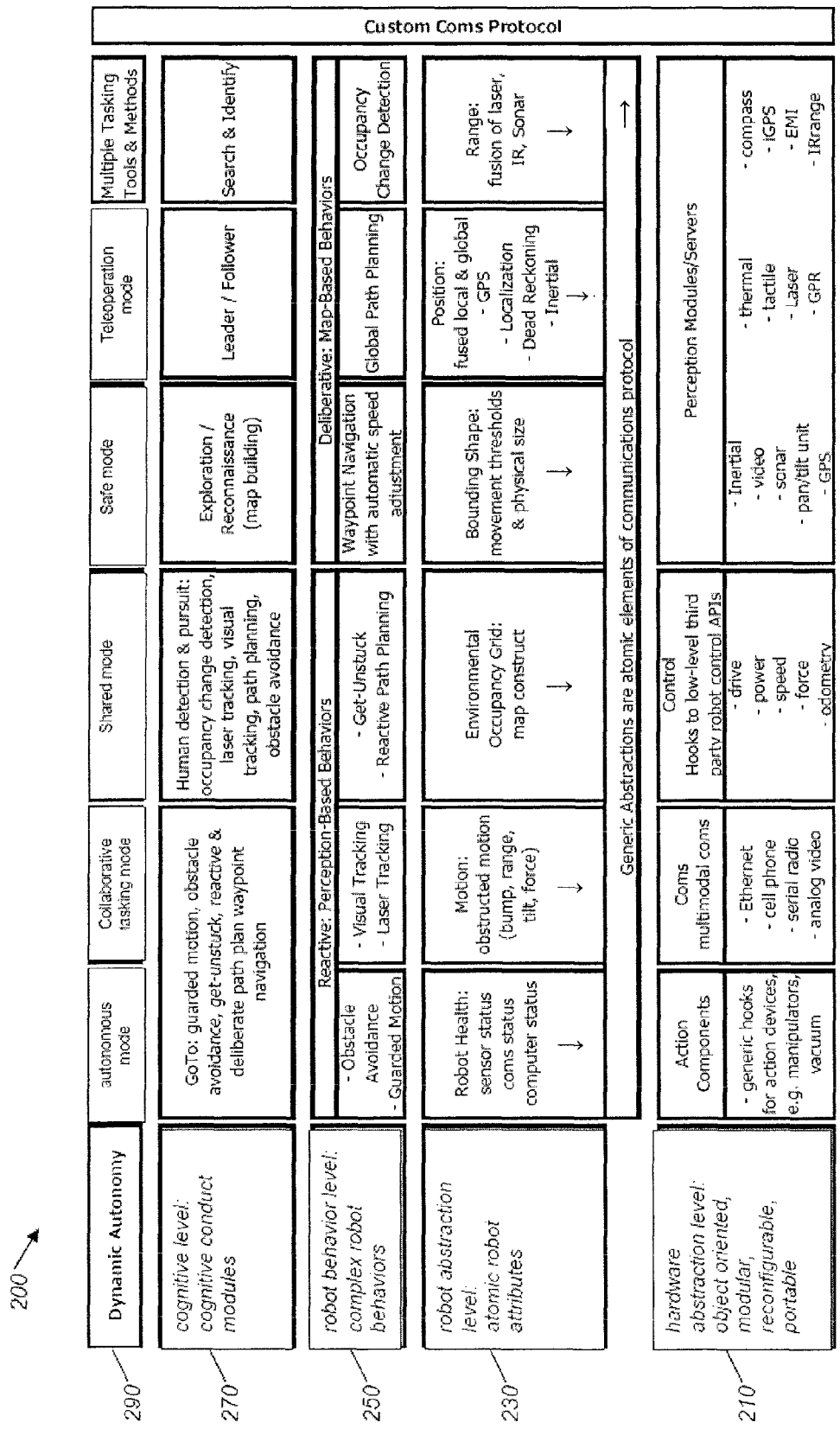
FIG. 3 is a software architecture diagram illustrating significant components of embodiments of the present disclosure.

FIG. 3 is a software architecture diagram 200 illustrating significant components of the GRA as a multi-level abstraction. Within the GRA, various levels of abstraction are available for use in developing robot behavior at different levels of dynamic autonomy 290. The object-oriented structure of the GRA may be thought of as including two basic levels. As is conventional in object-oriented class structures, each subsequent level inherits all of the functionality of the higher levels.

At the lower level, the GRA includes a hardware abstraction level, which provides for portable, object-oriented access to low-level hardware perception and control modules that may be present on a robot. The hardware abstraction level is reserved for hardware specific classes and includes, for example, implementations for the actual robot geometry and sensor placement on each robot type.

Above the hardware abstraction level, the GRA includes a robot abstraction level, which provides atomic elements (i.e., building blocks) of generic robot attributes and develops a membrane between the low-level hardware abstractions and controls. This membrane is based on generic robot attributes, or actionable components, which include robot functions, robot perceptions, and robot status. Each generic robot attribute may utilize a variety of hardware abstractions, and possibly other robot attributes, to accomplish its individual function.

The robot abstraction level may include implementations that are generic to given proprietary low-level APIs. Examples of functions in this class level include the interface calls for a variety of atomic level robot behaviors such as, for example, controlling motion and reading sonar data.

The GRA enables substantially seamless porting of behavioral intelligence to new hardware platforms and control APIs by defining generic robot attributes and actionable components to provide the membrane and translation between behavioral intelligence and the hardware. Once a definition for a robot in terms of platform geometries, sensors, and API calls has been specified, behavior and intelligence may be ported in a substantially seamless manner for future development. In addition, the object-oriented structure enables straightforward extension of the Generic Robot Architecture for defining new robot platforms as well as defining low-level abstractions for new perceptors, motivators, communications channels, and manipulators.

The GRA includes an interpreter such that existing and new robot behaviors port in a manner that is transparent to both the operator and the behavior developer. This interpreter may be used to translate commands and queries back and forth between the operator and robot with a common interface, which can then be used to create perceptual abstractions and behaviors. When the "common language" supported by the GRA is used by robot developers, it enables developed behaviors and functionality to be interchangeable across multiple robots. In addition to creating a framework for developing new robot capabilities, the GRA interpreter may be used to translate existing robot capabilities into the common language so that the behavior can then be used on other robots. The GRA is portable across a variety of platforms and proprietary low-level APIs. This is done by creating a standard method for commanding and querying robot functionality that exists on top of any particular robot manufacturer's control API. Moreover, unlike systems where behavior stems from sensor data, the GRA facilitates a consistent or predictable behavior output regardless of robot size or type by categorizing the robot and sensor data into perceptual abstractions from which behaviors can be built.

The Generic Robot Architecture also includes a scripting structure for orchestrating the launch of the different servers and executables that may be used for running the GRA on a particular robot platform. Note that since these servers and executables (e.g., laser server, camera server, and base platform application) will differ from robot to robot, the scripting structure includes the ability to easily specify and coordinate the launch of the files that may be needed for specific applications. In addition, the scripting structure enables automatic launching of the system at boot time so that the robot is able to exhibit functionality without any operator involvement (i.e., no need for a remote shell login).

The Generic Robot Architecture may access configuration files created for each defined robot type. For example, the configuration files may specify what sensors, actuators, and APIs are being used on a particular robot. Use of the scripting structure together with the configuration enables easy reconfiguration of the behaviors and functionality of the robot without having to modify source code (i.e., for example, recompile the C/C++ code).

The GRA keeps track of which capabilities are available (e.g., sensors, actuators, mapping systems, communications) on the specific embodiment and uses virtual and stub functions within the class hierarchy to ensure that commands and queries pertaining to capabilities that an individual robot does not have do not cause data access errors. For example, in a case where a specific capability, such as a manipulator, does not exist, the GRA returns special values indicating to the high-level behavioral control code that the command cannot be completed or that the capability does not exist. This makes it much easier to port seamlessly between different robot types by allowing the behavior code to adapt automatically to different robot configurations.

The above discussion of GRA capabilities has focused on the robot-oriented aspects of the GRA. However, the robot-oriented class structure is only one of many class structures included in the GRA. For example, the GRA also includes multitier class structures for communication, range sensing, cameras, and mapping. Each one of these class structures is set up to provide a level of functional modularity and allow different sensors and algorithms to be used interchangeably.

By way of example and not limitation, without changing the behavioral code built on the GRA at the robot behavior level, it may be possible to swap various mapping and localization systems or cameras and yet achieve the same functionality simply by including the proper class modules at the hardware abstraction level and possibly at the robot abstraction level. Additional capabilities and features of each of the levels of the GRA are discussed below.

Hardware Abstraction Level

Figure 4:
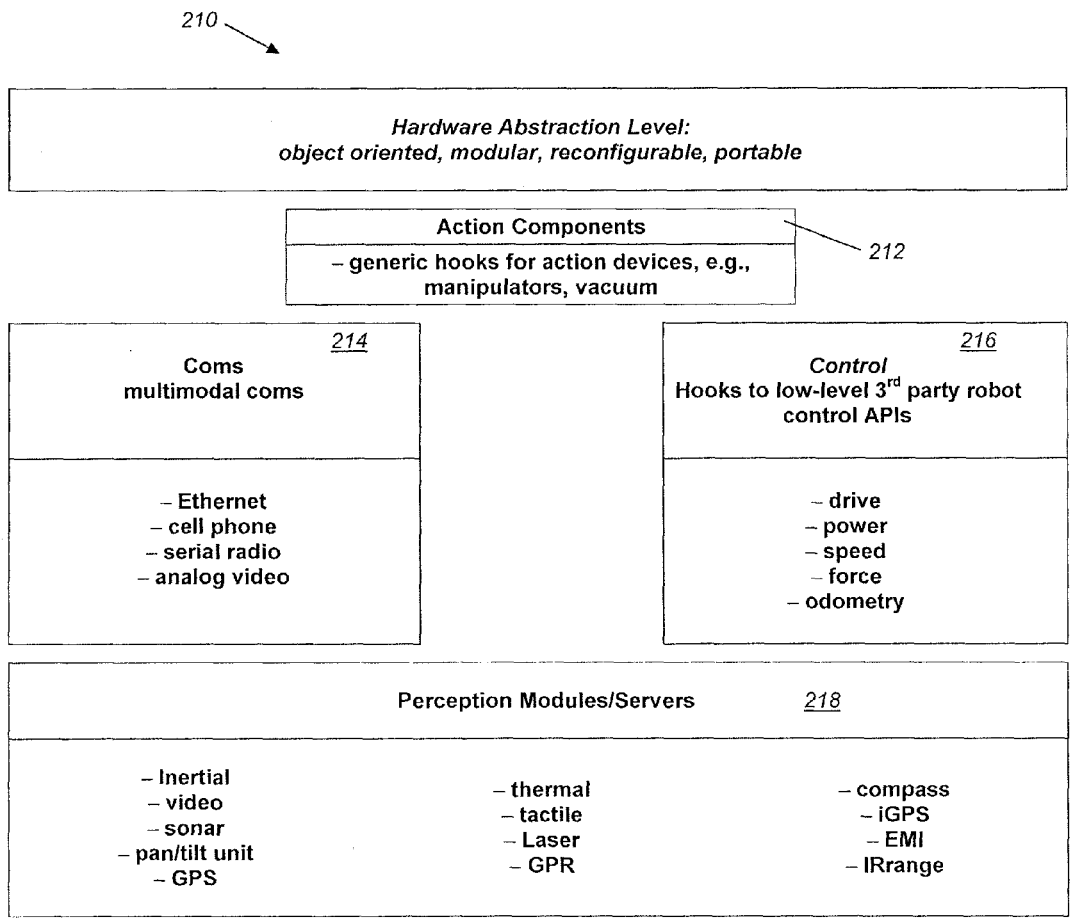
FIG. 4 illustrates representative hardware abstractions of hardware modules that may be available on robot platforms.

FIG. 4 illustrates a hardware abstraction level 210, which includes representative hardware abstractions of hardware modules that may be available on a robot platform. These hardware abstractions create an object-oriented interface between the software and hardware that is modular, reconfigurable, and portable across robot platforms. As a result, a software component can create a substantially generic hook to a wide variety of hardware that may perform a similar function. It will be readily apparent to those of ordinary skill in the art that the modules shown in FIG. 4 are a representative, rather than comprehensive example of hardware abstractions. Some of these hardware abstractions include; action abstractions 212 (also referred to as manipulation abstractions) for defining and controlling manipulation type devices on the robot, communication abstractions 214 for defining and controlling communication media and protocols, control abstractions 216 (also referred to as locomotion abstractions) for defining and controlling motion associated with various types of locomotion hardware, and perception abstractions 218 for defining and controlling a variety of hardware modules configured for perception of the robot's surroundings and pose (i.e., position and orientation).

Manipulation Abstractions

Action device abstractions 212 may include, for example, vacuum devices, magnetic pickup devices, arm manipulators, scoops, grippers, camera pan and tilt manipulators, and the like.

Communication Abstractions

The communication abstractions present substantially common communications interfaces to a variety of communication protocols and physical interfaces. The communication channels 160 may be adaptable to both wired and wireless communication, as well as supporting various communication protocols. By way of example and not limitation, the communication abstractions may be configured to support serial and parallel communication channels, such as, for example, USB, IEEE-1394, 802.11 a/b/g, cellular telephone, and other wired and wireless communication protocols.

Locomotion Abstractions

Locomotion abstractions 216 may be based on robot motion, not necessarily on specific hardware components. For example and not limitation, motion control abstractions may include drive, steering, power, speed, force, odometry, and the like. Thus, the motion abstractions can be tailored to individual third party drive controls at the hardware abstraction level and effectively abstracted away from other architectural components. In this manner, support for motion control of a new robot platform may comprise simply supplying the APIs, which control the actual motors, actuators, and the like, into the locomotion abstraction framework.

Perception Abstractions

The perception abstractions 218 may include abstractions for a variety of perceptive hardware useful for robots, such as, for example, inertial measurements, imaging devices, sonar measurements, camera pan/tilt abstractions, GPS and iGPS abstractions, thermal sensors, infrared sensors, tactile sensors, laser control and perception abstractions, GPR, compass measurements, EMI measurements, and range abstractions.

Robot Abstraction Level

Figure 5:
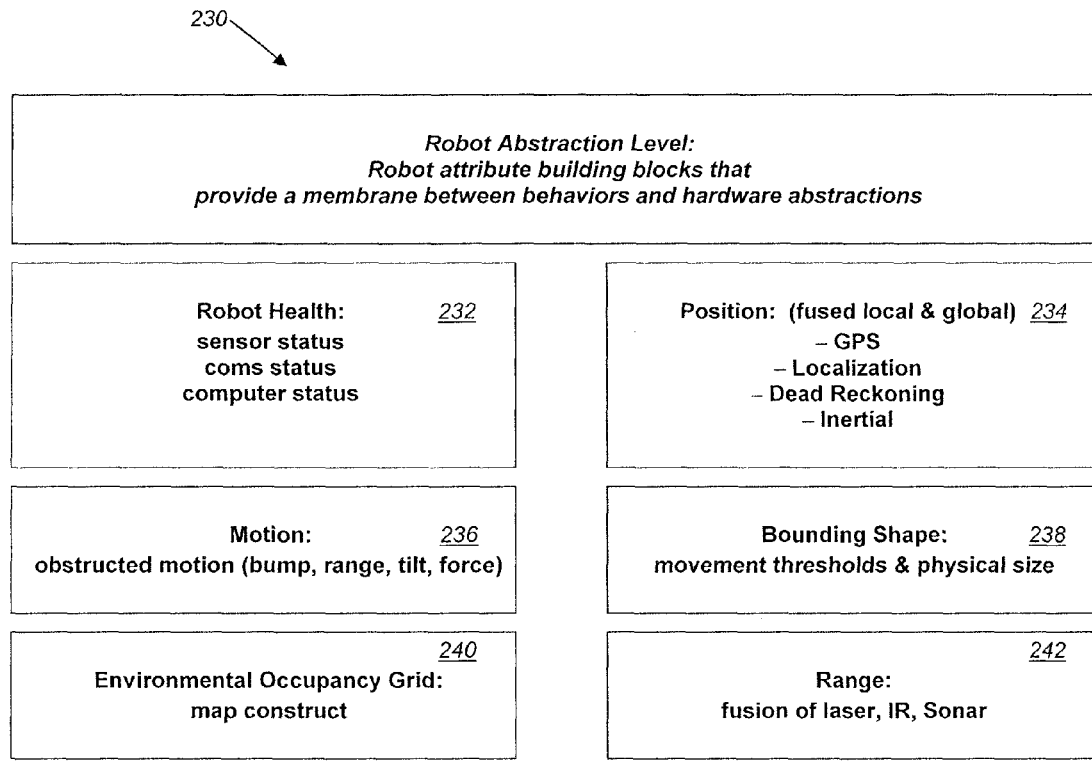
FIG. 5 illustrates a robot abstraction level including robot attributes that may be available on robot platforms.

While the hardware abstraction level 210 focuses on a software model for a wide variety of hardware that may be useful on robots, a robot abstraction level 230 (as illustrated in FIGS. 3 and 5) focuses on generic robot attributes. The generic robot attributes enable building blocks for defining robot behaviors at the robot behavior level and provide a membrane for separating the definition of robot behaviors from the low-level hardware abstractions. Thus, each robot attribute may utilize one or more hardware abstractions to define its attribute. These robot attributes may be thought of as actionable abstractions. In other words, a given actionable abstraction may fuse multiple hardware abstractions that provide similar information into a data set for a specific robot attribute. For example and not limitation, the generic robot attribute of "range" may fuse range data from hardware abstractions of an IR sensor and a laser sensor to present a single coherent structure for the range attribute. In this way, the GRA presents robot attributes as building blocks of interest for creating robot behaviors such that, the robot behavior can use the attribute to develop a resulting behavior (e.g., stop, slow down, turn right, turn left, etc.).

Furthermore, a robot attribute may combine information from dissimilar hardware abstractions. By way of example and not limitation, the position attributes may fuse information from a wide array of hardware abstractions, such as: perception modules like video, compass, GPS, laser, and sonar; along with control modules like drive, speed, and odometry. Similarly, a motion attribute may include information from position, inertia, range, and obstruction abstractions.

This abstraction of robot attributes frees the developer from dealing with individual hardware elements. In addition, each robot attribute can adapt to the amount, and type of information it incorporates into the abstraction based on what hardware abstractions may be available on the robot platform.

The robot attributes, as illustrated in FIG. 5, are defined at a relatively low level of atomic elements that include attributes of interest for a robot's perception, status, and control. Some of these robot attributes include; robot health 232, robot position 234, robot motion 236, robot bounding shape 238, environmental occupancy grid 240, and range attributes 242. It will be readily apparent to those of ordinary skill in the art that the modules shown in FIG. 5 are a representative, rather than comprehensive, example of robot attributes. Note that the term "robot attributes" is used somewhat loosely, given that robot attributes may include physical attributes such as robot health abstractions 232 and bounding shape 238 as well as how the robot perceives its environment, such as the environmental occupancy grid 240 and range attributes 242.

Robot Health

The robot health abstractions 232 may include, for example, general object models for determining the status and presence of various sensors and hardware modules, determining the status and presence of various communication modules, and determining the status of on-board computer components.

Robot Bounding Shape

The robot bounding shape 238 abstractions may include, for example, definitions of the physical size and boundaries of the robot and definitions of various thresholds for movement that define a safety zone or event horizon, as is explained more fully below.

Robot Motion

The robot motion abstractions 236 may include abstractions for defining robot motion and orientation attributes such as, for example, obstructed motion, velocity, linear and angular accelerations, forces, and bump into obstacle, and orientation attributes such as roll, yaw and pitch.

Range

The range abstractions 242 may include, for example, determination of range to obstacles from lasers, sonar, infrared, and fused combinations thereof.

Figure 6:
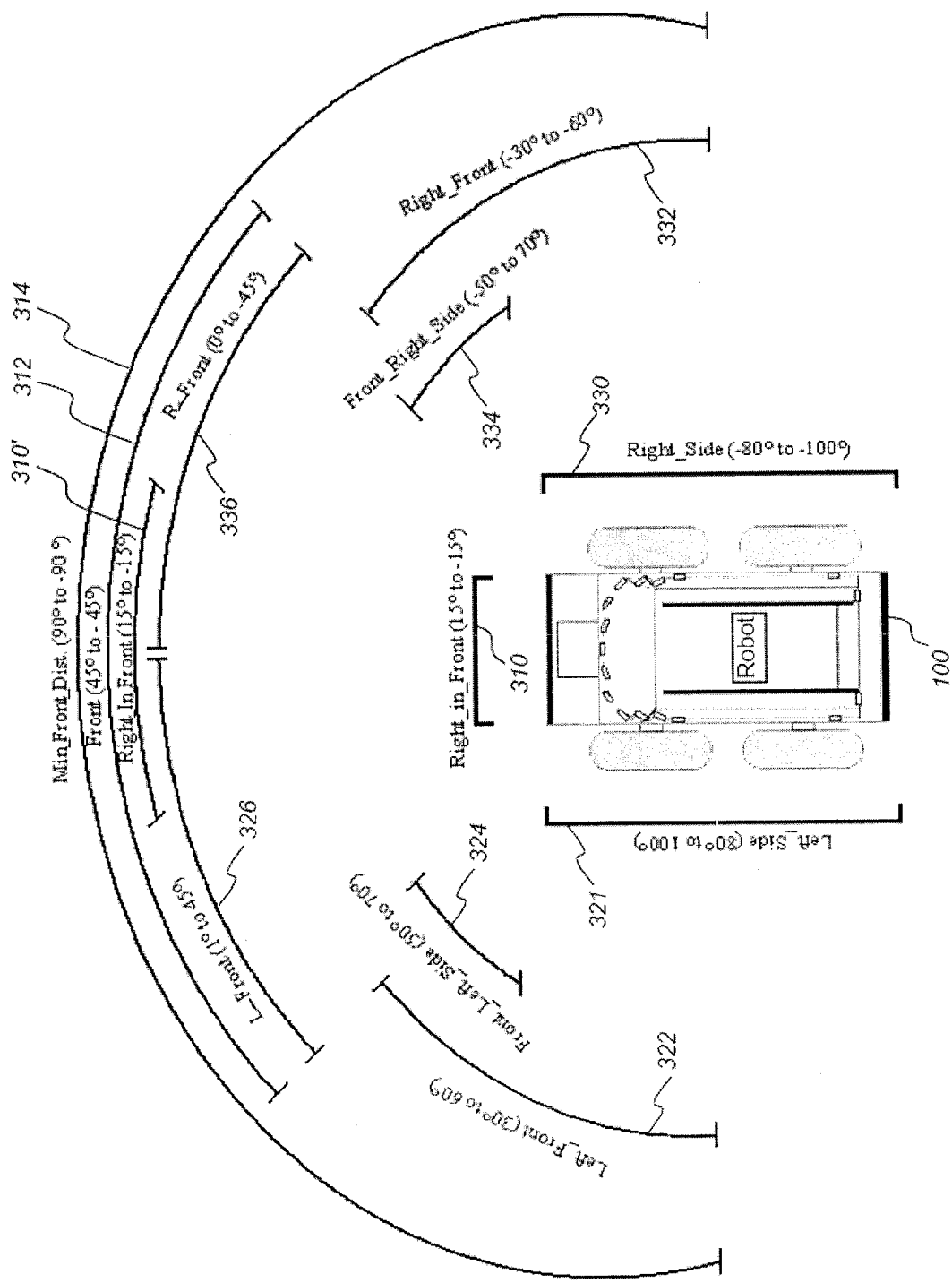
FIG. 6 illustrates a representative embodiment of how a range abstraction may be organized.

In more detail, FIG. 6 illustrates a representative embodiment of how a range abstraction may be organized. A variety of coordinate systems may be in use by the robot and an operator. By way of example, a local coordinate system may be defined by an operator relative to a space of interest (e.g., a building) or a world coordinate system defined by sensors such as a GPS unit, an iGPS unit, a compass, an altimeter, and the like. A robot coordinate system may be defined in Cartesian coordinates relative to the robot's orientation such that, for example, the X-axis is to the right, the Y-axis is straight ahead, and the Z-axis is up. Another robot coordinate system may be cylindrical coordinates with a range, angle, and height relative to the robot's current orientation.

The range measurements for the representative embodiment illustrated in FIG. 6 are organized in a cylindrical coordinate system relative to the robot. The angles may be partitioned into regions covering the front, left, right and back of the robot and given names such as, for example, those used in FIG. 6.

Thus, regions in front may be defined and named as:
Right_In_Front (310 and 310'), representing an angle between −15° and 15°;
Front 312, representing an angle between −45° and 45°; and
Min_Front_Dist 314, representing an angle between −90° and 90°.

Similarly, regions to the left side may be defined as:
Left_Side 321, representing an angle between 100° and 80°;
Left_Front 322, representing an angle between 60° and 30°;
Front_Left_Side 324, representing an angle between 70° and 50°; and
L_Front 326, representing an angle between 45° and 1°.

For the right side, regions may be defined as:
Right_Side 330, representing an angle between −100° and −80°;
Right_Front 332, representing an angle between −60° and −30°;
Front_Right_Side 334, representing an angle between −70° and −50°; and
R_Front 336, representing an angle between −45° and 0°.

While not shown, those of ordinary skill in the art will recognize that with the exception of the Left_Side 321 and Right_Side 330 regions, embodiments may include regions in the back, which are a mirror image of those in the front wherein the "Front" portion of the name is replaced with "Rear."

Furthermore, the range attributes define a range to the closest object within that range. However, the abstraction of regions relative to the robot, as used in the range abstraction may also be useful for many other robot attributes and robot behaviors that may require directional readings, such as, for example, defining robot position, robot motion, camera positioning, an occupancy grid map, and the like.

In practice, the range attributes may be combined to define a more specific direction. For example, directly forward motion may be defined as a geometrically adjusted combination of Right_In_Front 310, L_Front 326, R_Front 336, Front_Left_Side 324, and Front_Right_Side 334.

Robot Position and Environmental Occupancy Grid Maps

Returning to FIG. 5, the robot abstractions may include position attributes 234. Mobile robots may operate effectively only if they, or their operators, know where they are. Conventional robots may rely on real-time video and global positioning systems (GPS) as well as existing maps and floor plans to determine their location. However, GPS may not be reliable indoors and video images may be obscured by smoke or dust, or break up because of poor communications. Maps and floor plans may not be current and often are not readily available, particularly in the chaotic aftermath of natural, accidental or terrorist events. Consequently, real-world conditions on the ground often make conventional robots that rely on a priori maps ineffective.

Accurate positioning knowledge enables the creation of high-resolution maps and accurate path following, which may be needed for high-level deliberative behavior, such as systematically searching or patrolling an area.

Embodiments of the present disclosure may utilize various mapping or localization techniques including positioning systems such as indoor GPS, outdoor GPS, differential GPS, theodolite systems, wheel-encoder information, and the like. To make robots more autonomous, embodiments of the present disclosure may fuse the mapping and localization information to build 3D maps on-the-fly that let robots understand their current position and an estimate of their surroundings. Using existing information, map details may be enhanced as the robot moves through the environment. Ultimately, a complete map containing rooms, hallways, doorways, obstacles and targets may be available for use by the robot and its human operator. These maps also may be shared with other robots or human first responders.

With the on-board mapping and positioning algorithm that accepts input from a variety of range sensors, the robot may make substantially seamless transitions between indoor and outdoor operations without regard for GPS and video dropouts that occur during these transitions. Furthermore, embodiments of the present disclosure provide enhanced fault tolerance because they do not require off-board computing or reliance on potentially inaccurate or non-existent a priori maps.

Embodiments of the present disclosure may use localization methods by sampling range readings from scanning lasers and ultrasonic sensors and by reasoning probabilistically about where the robot is within its internal model of the world. The robot localization problem may be divided into two sub-tasks: global position estimation and local position tracking. Global position estimation is the ability to determine the robot's position in an a priori or previously learned map, given no information other than that the robot is somewhere in the region represented by the map. Once a robot's position has been found in the map, local tracking is the problem of keeping track of the robot's position over time and movement.

The robot's state space may be enhanced by localizaton methods such as Monte Carlo techniques and Markovian probability grid approaches for position estimation, as are well known by those of ordinary skill in the art. Many of these techniques provide efficient and substantially accurate mobile robot localization.

With a substantially accurate position for the robot determined, local tracking can maintain the robot's position over time and movement using dead-reckoning, additional global positioning estimation, or combinations thereof. Dead-reckoning is a method of navigation by keeping track of how far you have gone in any particular direction. For example, dead-reckoning would determine that a robot has moved a distance of about five meters at an angle from the current pose of about 37 degrees if the robot moves four meters forward, turns 90 degrees to the right, and moves forward three meters. Dead-reckoning can lead to navigation errors if the distance traveled in a given direction, or the angle through which a robot turns, is interpreted incorrectly. This can happen, for example, if one or more of the wheels on the robot spin in place when the robot encounters an obstacle.

Therefore, dead-reckoning accuracy may be bolstered by sensor information from the environment, new global positioning estimates, or combinations thereof. With some form of a map, the robot can use range measurements to map features to enhance the accuracy of a pose estimate. Furthermore, the accuracy of a pose estimate may be enhanced by new range measurements (e.g., laser scans) into a map that may be growing in size and accuracy. In Simultaneous Localization and Mapping (SLAM), information from the robot's encoders and laser sensors may be represented as a network of probabilistic constraints linking the successive positions (poses) of the robot. The encoders may relate one robot pose to the next via dead-reckoning. To give further constraints between robot poses, the laser scans may be matched with dead-reckoning, including constraints for when a robot returns to a previously visited area.

Figure 7:
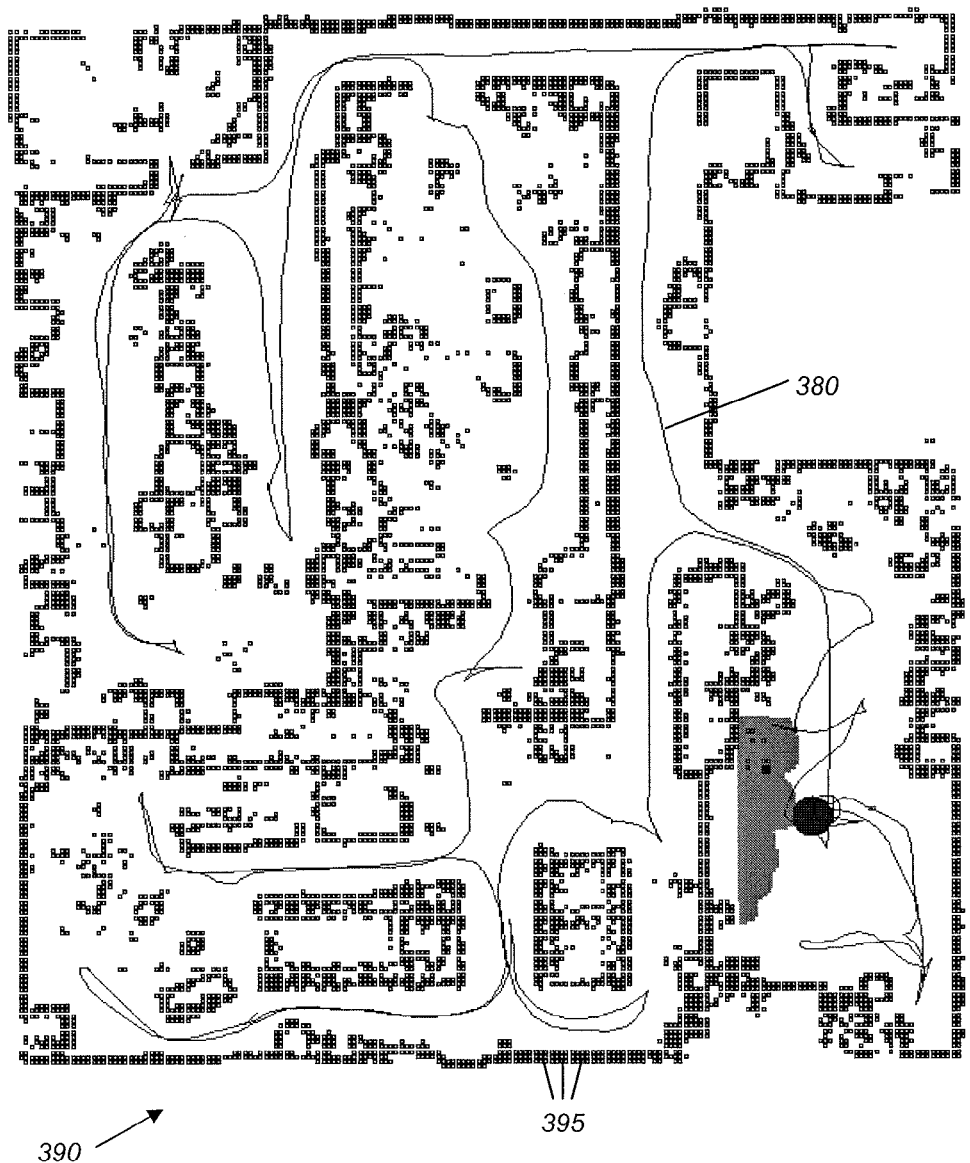
FIG. 7 illustrates an occupancy grid map that may be developed by embodiments of the present disclosure.

The robot abstractions may include environmental occupancy grid 240 attributes. One form of map that may be useful from both the robot's perspective and an operator's perspective is an occupancy grid. An environmental occupancy grid 240, formed by an occupancy grid abstraction (FIG. 5) is illustrated in FIG. 7. In forming an occupancy grid, a robot coordinate system may be defined in Cartesian coordinates relative to the robot's orientation such that, for example, the X-axis is to the right, the Y-axis is straight ahead, and the Z-axis is up. Another robot coordinate system may be defined in cylindrical coordinates with a range, angle, and height relative to the robot's current orientation. Furthermore, occupancy grids may be translated to other coordinate systems for use by an operator.

An occupancy grid map 390 may be developed by dividing the environment into a discrete grid of occupancy cells 395 and assigning a probability to each grid indicating whether the grid is occupied by an object. Initially, the occupancy grid may be set so that every occupancy cell 395 is set to an initial probability. As the robot scans the environment, range data developed from the scans may be used to update the occupancy grid. For example, based on range data, the robot may detect an object at a specific orientation and range away from the robot. This range data may be converted to a different coordinate system (e.g., local or world Cartesian coordinates). As a result of this detection, the robot may increase the probability that the particular occupancy cell 395 is occupied and decrease the probability that occupancy cells 395 between the robot and the detected object are occupied. As the robot moves through its environment, new horizons may be exposed to the robot's sensors, which enable the occupancy grid to be expanded and enhanced. To enhance map building and localization even further, multiple robots may explore an environment and cooperatively communicate their map information to each other or a robot controller to cooperatively build a map of the area.

The example occupancy grid map 390 as it might be presented to an operator is illustrated in FIG. 7. The grid of occupancy cells 395 can be seen as small squares on this occupancy grid 390. A robot path 380 is shown to illustrate how the robot may have moved through the environment in constructing the occupancy grid 390. Of course, those of ordinary skill in the art will recognize that, depending on the application and expected environment, the occupancy grid 390 may be defined in any suitable coordinate system and may vary in resolution (i.e., size of each occupancy cell 395). In addition, the occupancy grid 390 may include a dynamic resolution such that the resolution may start out quite coarse while the robot discovers the environment, then evolve to a finer resolution as the robot becomes more familiar with its surroundings.

Robotic Intelligence Kernel

A robot platform 100 may include a robot intelligence kernel (may also be referred to herein as "intelligence kernel"), which coalesces hardware components for sensing, motion, manipulation, and actions with software components for perception, communication, behavior, and world modeling into a single cognitive behavior kernel that provides intrinsic intelligence for a wide variety of unmanned robot platforms. The intelligence kernel architecture may be configured to support multiple levels of robot autonomy that may be dynamically modified depending on operating conditions and operator wishes.

The robot intelligence kernel (RIK) may be used for developing a variety of intelligent robotic capabilities. By way of example and not limitation, some of these capabilities including visual pursuit, intruder detection and neutralization, security applications, urban reconnaissance, search and rescue, remote contamination survey, and countermine operations.

Referring back to the software architecture diagram of FIG. 3, the RIK comprises a multi-level abstraction including a robot behavior level 250 and a cognitive level 270. The RIK may also include the robot abstraction level 230 and the hardware abstraction level 210 discussed above.

Above the robot abstraction level 230, the RIK includes the robot behavior level 250, which defines specific complex behaviors that a robot, or a robot operator, may want to accomplish. Each complex robot behavior may utilize a variety of robot attributes, and in some cases a variety of hardware abstractions, to perform the specific robot behavior.

Above the robot behavior level 250, the RIK includes the cognitive level 270, which provides cognitive conduct modules to blend and orchestrate the asynchronous events from the complex robot behaviors and generic robot behaviors into combinations of functions exhibiting cognitive behaviors, wherein high-level decision making may be performed by the robot, the operator, or combinations of the robot and the operator.

Some embodiments of the RIK may include, at the lowest level, the hardware abstraction level 210, which provides for portable, object-oriented access to low-level hardware perception and control modules that may be present on a robot. These hardware abstractions have been discussed above in the discussion of the GRA.

Some embodiments of the RIK may include, above the hardware abstraction level 210, the robot abstraction level 230 including generic robot abstractions, which provide atomic elements (i.e., building blocks) of generic robot attributes and develop a membrane between the low-level hardware abstractions and control based on generic robot functions. Each generic robot abstraction may utilize a variety of hardware abstractions to accomplish its individual function. These generic robot abstractions have been discussed above in the discussion of the GRA.

Robot Behaviors

While the robot abstraction level 230 focuses on generic robot attributes, higher levels of the RIK may focus on; relatively complex robot behaviors at the robot behavior level 250, or on robot intelligence and operator collaboration at the cognitive level 270.

The robot behavior level 250 includes generic robot classes comprising functionality common to supporting behavior across most robot types. For example, the robot behavior level includes utility functions (e.g., Calculate angle to goal) and data structures that apply across substantially all robot types (e.g., waypoint lists). At the same time, the robot behavior level defines the abstractions to be free from implementation specifics such that the robot behaviors are substantially generic to all robots.

Figure 8:
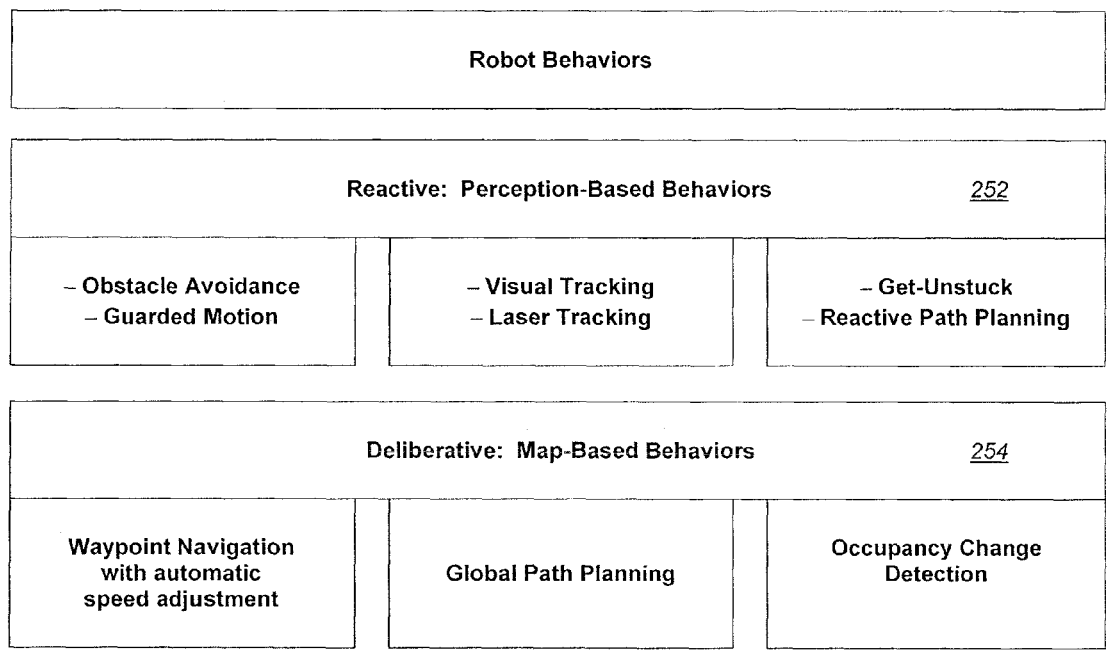
FIG. 8 illustrates representative robot behavioral components that may be available on robot platforms.

The robot behavior level 250, as illustrated in FIG. 8, may be loosely separated into reactive behaviors 252 and deliberative behaviors 254. Of course, it will be readily apparent to those of ordinary skill in the art that the modules shown in FIG. 8 are a representative, rather than comprehensive, example of robot behaviors.

The reactive behaviors 252 may be characterized as behaviors wherein the robot reacts to its perception of the environment based on robot attributes, hardware abstractions, or combinations thereof. Some of these reactive behaviors 252 may include autonomous navigation, obstacle avoidance, guarded motion, visual tracking, laser tracking, get-unstuck behavior, and reactive planning. As examples, and not limitations, details regarding some of these behaviors are discussed in the section below regarding application specific behaviors.

In contrast, deliberative behaviors 254 may be characterized as behaviors wherein the robot may need to make decisions on how to proceed based on the results of the reactive behaviors, information from the robot attributes and hardware abstractions, or combinations thereof. Some of these deliberative behaviors 254 may include waypoint navigation with automatic speed adjustment, global path planning, and occupancy change detection. As examples, and not limitations, details regarding some of these behaviors are discussed in the section below regarding application specific behaviors.

Cognitive Conduct

Figures 10A, 10B:
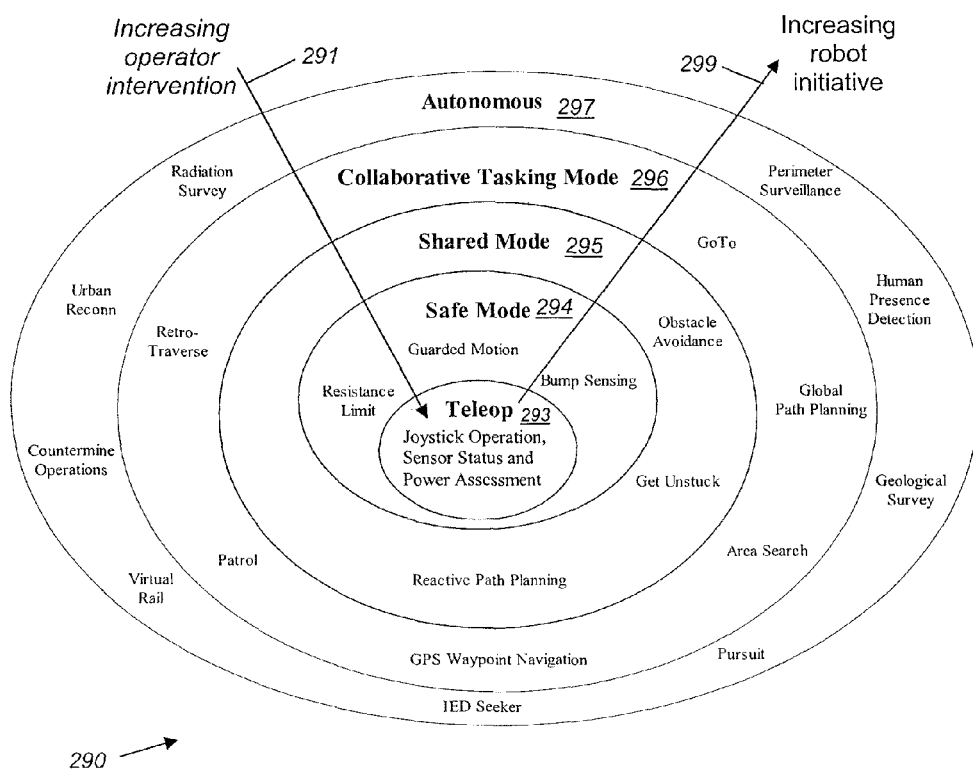
FIG. 10A illustrates how tasks may be allocated between an operator and a robot according to embodiments of the present disclosure.
FIG. 10B illustrates various cognitive conduct, robot behaviors, robot attributes, and hardware abstractions that may be available at different levels of robot autonomy.

The cognitive conduct level 270, as illustrated in FIG. 9, represents the highest level of abstraction, wherein significant robot intelligence may be built in to cognitive conduct modules, as well as significant operator-robot collaboration to perform complex tasks requiring enhanced robot initiative 299 (see FIG. 10B). Cognitive conduct modules blend and orchestrate asynchronous firings from the reactive behaviors 252, deliberative behaviors 254, and robot attributes 230 into intelligent robot conduct. Cognitive conduct modules may include conduct such as GoTo 272, wherein the operator may simply give a coordinate for the robot to "go to" and the robot takes the initiative to plan a path and get to the specified location. This GoTo conduct 272 may include a combination of robot behaviors 250, robot attributes 230, and hardware abstractions 210, such as, for example, obstacle avoidance, get-unstuck, reactive path planning, deliberative path planning, and waypoint navigation.

Another representative cognitive conduct module is human detection and pursuit 274, wherein the robot may react to changes in the environment and pursue those changes. This detection and pursuit 274 conduct may also include pursuit of other objects, such as, for example, another robot. The detection and pursuit 274 conduct may include a combination of robot behaviors 250, robot attributes 230, and hardware abstractions 210, such as, for example, occupancy change detection, laser tracking, visual tracking, deliberative path planning, reactive path planning, and obstacle avoidance.

Other representative cognitive conduct modules include conduct such as exploration and reconnaissance conduct 276, combined with map building, leader/follower conduct 278, and search and identify conduct 280.

Of course, it will be readily apparent to those of ordinary skill in the art that the cognitive conduct modules shown in FIG. 9 are a representative, rather than comprehensive example of robot conduct that may be implemented using embodiments of the present disclosure.

Timing and Behavior Adaptation

A notable aspect of the RIK is that the cognitive conduct modules 270 and robot behaviors 250 generally operate from a perception of speed of motion in relationship to objects and obstacles. In other words, rather than being concerned with spatial horizons and the distance away from an object, the cognitive conduct 270 and robot behaviors 250 are largely concerned with temporal horizons and how soon the robot may encounter an object. This enables defining the cognitive conduct 270 and robot behaviors 250 in a relativistic sense wherein, for example, the modules interpret motion as an event horizon wherein the robot may only be concerned with obstacles inside the event horizon. For example, a robot behavior 250 is not necessarily concerned with an object that is 10 meters away. Rather, the robot behavior 250 may be concerned that it may reach the object in two seconds. Thus, the object may be within the event horizon when the object is 10 meters away and the robot is moving toward it at 5 meters/second, whereas if the object is 10 meters away and the robot is moving at 2 meters/second, the object may not be within the event horizon.

This relativistic perception enables an adaptation to processing power and current task load. If the robot is very busy, for example, processing video, it may need to reduce its frequency of processing each task. In other words, the amount of time to loop through all the cognitive conduct 270 and robot behaviors 250 may increase. However, with the RIK, the cognitive conduct 270 and robot behaviors 250 can adapt to this difference in frequency by modifying its robot behaviors 250. For example, if the time through a loop reduces from 200 Hz to 100 Hz, the robot behaviors 250 and cognitive conduct 270 will know about this change in loop frequency and may modify the way it makes a speed adjustment to avoid an object. For example, the robot may need a larger change in its speed of motion to account for the fact that the next opportunity to adjust the speed is twice more distant in the future at 100 Hz than it would be at 200 Hz. This becomes more apparent in the discussion below, regarding the guarded motion behavior.

To enable and control this temporal awareness, the RIK includes a global timing loop in which cognitive conduct 270 and robot behaviors 250 may operate. Using this global timing loop, each module can be made aware of information such as, for example, average time through a loop minimum and maximum time through a loop, and expected delay for next timing tick.

With this temporal awareness, the robot tends to modify its behavior by adjusting its motion, and motion of its manipulators, relative to its surroundings rather than adjusting its position relative to a distance to an object. Of course, with the wide array of perceptors, the robot is still very much aware of its pose and position relative to its environment and can modify its behavior based on this positional awareness. However, with the RIK, the temporal awareness is generally more influential on the cognitive conduct modules and robot behaviors than the positional awareness.

Dynamic Autonomy

To enhance the operator/robot tradeoff of control, the intelligence kernel provides a dynamic autonomy structure, which is a decomposition of autonomy levels, allowing methods for shared control to permeate all levels of the multi-level abstraction. Furthermore, the intelligence kernel creates an object-oriented software architecture, which may require little or no source code changes when ported to other platforms and low-level proprietary controllers.

The dynamic autonomy structure of the RIK provides a multi-level harmonization between human intervention and robot initiative 299 across robot behaviors. As capabilities and limitations change for both the human and the robot due to workload, operator expertise, communication dropout, and other factors, the RIK architecture enables shifts from one level of autonomy to another. Consequently, the ability of the robot to protect itself, make decisions, and accomplish tasks without human assistance may enable increased operator efficiency.

FIGS. 10A and 10B are depictions of a representative embodiment of a dynamic autonomy structure illustrating different levels of interaction between operator intervention 291 and robot initiative 299. As referred to herein operator, or operator intervention 291, may include human operation via a remote computer in communication with the robot, remote operation by some other form of artificial intelligence operating on a remote computer in communication with the robot, or some combination thereof.

At the lowest level, referred to as teleoperation mode 293, the robot may operate completely under remote control and take no initiative to perform operations on its own. At the second level, referred to as safe mode 294, robot movement is dependent on manual control from a remote operator. However, in safe mode 294, the robot may be equipped with a level of initiative that prevents the operator from causing the robot to collide with obstacles. At the third level, referred to as shared mode 295, the robot can relieve the operator from the burden of direct control. For example, the robot may use reactive navigation to find a path based on the robot's perception of the environment. Shared mode 295 provides for a balanced allocation of roles and responsibilities. The robot accepts varying levels of operator intervention 291 and may support dialogue through the use of scripted suggestions (e.g., "Path blocked! Continue left or right?") and other text messages that may appear within a graphical interface. At the fourth level, referred to as collaborative tasking mode 296, a high-level of collaborative tasking may be developed between the operator and the robot using a series of high-level tasks such as patrol, search region or follow path. In collaborative tasking mode 296, operator intervention 291 occurs on the tasking level, while the robot manages most decision-making and navigation. At the highest level, referred to as autonomous mode 297, a robot may behave in a substantially autonomous manner, needing nothing more than being enabled by an operator and perhaps given a very high-level command such as, for example, survey the area, or search for humans.

FIG. 10A illustrates a representative embodiment of how tasks may be allocated between the operator and the robot. For example, teleoperation mode 293 may be configured such that the operator defines tasks, supervises direction, motivates motion, and prevents collision, in such a way that the robot takes no initiative and the operator maintains control. In safe mode 294, the operator may still define tasks, supervise direction, and motivate motion, while allowing the robot to take the initiative to prevent collisions. In shared mode 295, the operator may still define tasks and supervise direction, while allowing the robot to motivate motion and prevent collisions. In collaborative tasking mode 296, the robot may possess the initiative to prevent collisions, motivate motion, and supervise direction, while relinquishing operator intervention 291 to define task goals. In autonomous mode 297, the robot's initiative may prevent collisions, motivate motion, supervise direction, and define task goals. Of course, those of ordinary skill in the art will recognize that this allocation of tasks between the operator and the robot is a representative allocation. Many other tasks and behaviors, and allocation of those tasks and behaviors, are contemplated within the scope of the present disclosure.

FIG. 10B illustrates various cognitive conduct, robot behaviors, robot attributes, and hardware abstractions that may be available at different levels of robot dynamic autonomy 290. In general, moving from the teleoperation mode 293 toward the autonomous mode 297 represents an increase in the amount of robot initiative 299 and a decrease in the amount of operator intervention 291. Conversely, moving from the autonomous mode 297 toward the teleoperation mode 293 represents a decrease in the amount of robot initiative 299 and an increase in the amount of operator intervention 291. Of course, those of ordinary skill in the art will recognize that FIG. 10B is a representative sample of available conduct, behaviors, attributes, and hardware, as well as a representative allocation between autonomy levels. The RIK is configured such that many modules may operate across different levels of autonomy by modifying the amount of operator intervention 291, modifying the amount of robot initiative 299, or combinations thereof.

The autonomy levels are structured in the robot intelligence kernel such that each new level of autonomy is built on, and encompasses, the subsequent level. For example, a guarded motion mode processing (explained more fully below) may include the behavior and representational framework utilized by the teleoperation mode 293 processing, but also include additional levels of robot initiative 299 based on the various robot attributes (e.g., related to directional motion) created in response to the teleoperation mode 293. Shared mode 295 may include all of the functionality and direct control of safe mode 294, but also allows robot initiative 299 in response to the abstractions produced through the guarded motion mode processing (e.g., fused range abstractions created in response to the direction motion abstractions). In addition, the collaborative tasking mode 296 may initiate robot responses to the abstractions created in shared mode 295 processing such as recognition that a box canyon has been entered or that a communication link has been lost.

For a robotic system to gracefully accept a full spectrum of intervention possibilities, interaction issues cannot be handled merely as augmentations to a control system. Therefore, opportunities for operator intervention 291 and robot initiative 299 are incorporated as an integral part of the robot's intrinsic intelligence. Moreover, for autonomous capabilities to evolve, the RIK is configured such that a robot is able to recognize when help is needed from an operator, other robot, or combinations thereof and learn from these interactions.

As an example, in one representative embodiment, the robot includes a Sony CCD camera that can pan, tilt and zoom to provide visual feedback to the operator in the teleoperation mode 293. The robot may also use this camera with increased robot initiative 299 to characterize the environment and even conduct object tracking.

In this embodiment, the RIK provides a graduated process for the robot to protect itself and the environment. To do so, the RIK may fuse a variety of range sensor information. A laser range finder may be mounted on the front, and sonar perceptors may be located around the mid-section of the robot. The robot also may include highly sensitive bump strips around its perimeter that register whether anything has been touched. To protect the top of the robot, especially the cameras and mission-specific sensors placed on top of the robot, infrared proximity sensors may be included to indicate when an object is less than a few inches from the robot. Additional infrared proximity sensors may be placed on the bottom of the robot and point ahead of the robot toward the ground in order to prevent the robot from traveling into an open space (e.g., traveling off of a landing down a stairway). Together, these sensors provide a substantial field of protection around the robot and allow the operator to command the robot with increased confidence so that the robot can take initiative to protect itself or its environment.

However, avoiding obstacles may be insufficient. Many adverse environments may include forms of uneven terrain, such as rubble. The robot should be able to recognize and respond to these obstacles. Inertial sensors may be used to provide acceleration data in three dimensions. This inertial information may be fused with information from the wheel encoders giving velocity and acceleration of the wheels, and an electrical current may be drawn from the batteries, to produce a measure of "unexpected" resistance that may be encountered by the robot. As part of the dynamic autonomy, the operator may be able to choose to set a resistance limit that will automatically stop the robot once the specified threshold has been exceeded. The resistance limit may be useful not only for rough terrain, but also in situations when the operator needs to override the "safe motion" capabilities (based on the obstacle avoidance sensors) to do things like push chairs and boxes out of the way and push doors open.

In addition, the RIK enables operators to collaborate with mobile robots, by defining an appropriate level of discourse, including a shared vocabulary and a shared cognitive workspace collaboratively constructed and updated on-the-fly through interaction with the real world. This cognitive workspace could consist of terrain overlaid with semantic abstractions generated through autonomous recognition of environmental features with point-and-click operator validation and iconographic insertion of map entities. Real-time semantic maps constructed collaboratively by humans, ground robots and air vehicles could serve as the basis for a spectrum of mutual human-robot interactions including tasking, situation awareness, human-assisted perception and collaborative environmental "understanding." Thus, the RIK enables human-robot communication within the context of a mission based on shared semantic maps between the robotic system and the operator.

With reference to FIGS. 10A and 10B, additional details of the dynamic autonomy structure 290 and corresponding operation modes can be discussed.

Teleoperation Mode

In teleoperation mode 293, the operator has full, continuous control of the robot at a low level. The robot takes little or no initiative except, for example, to stop after a specified time if it recognizes that communications have failed. Because the robot takes little or no initiative in this mode, the dynamic autonomy implementation provides appropriate situation awareness to the operator using perceptual data fused from many different sensors. For example, a tilt sensor may provide data on whether the robot is in danger of overturning. Inertial effects and abnormal torque on the wheels (i.e., forces not associated with acceleration) are fused to produce a measure of resistance as when, for example, the robot is climbing over or pushing against an obstacle. Even in teleoperation mode 293, the operator may be able to choose to activate a resistance limit that permits the robot to respond to high resistance and bump sensors. Also, a specialized interface may provide the operator with abstracted auditory, graphical and textual representations of the environment and task.

Some representative behaviors and attributes that may be defined for teleoperation mode 293 include joystick operation, perceptor status, power assessment, and system status.

Safe Mode

In safe mode 294, the operator directs movements of the robot, but the robot takes initiative to protect itself. In doing so, this mode frees the operator to issue motion commands with less regard to protecting the robot, greatly accelerating the speed and confidence with which the operator can accomplish remote tasks. The robot may assess its own status and surrounding environment to decide whether commands are safe. For example, the robot possesses a substantial self-awareness of its position and will attempt to stop its motion before a collision, placing minimal limits on the operator. In addition, the robot may be configured to notify the operator of environmental features (e.g., box canyon, corner, and hallway), immediate obstacles, tilt, resistance, etc., and also continuously assesses the validity of its diverse sensor readings and communication capabilities. In safe mode 294, the robot may be configured to refuse to undertake a task if it does not have the ability (i.e., sufficient power or perceptual resources) to safely accomplish it.

Some representative behaviors and attributes that may be defined for safe mode 294 include guarded motion, resistance limits, and bump sensing.

Shared Mode

In shared mode 295, the robot may take the initiative to choose its own path, responds autonomously to the environment, and work to accomplish local objectives. This initiative is primarily reactive rather than deliberative. In terms of navigation, shared mode 295 may be configured such that the robot responds only to its local (e.g., a two second event horizon or a six meter radius), sensed environment. Although the robot may handle the low-level navigation and obstacle avoidance, the operator may supply intermittent input, often at the robot's request, to guide the robot in general directions. For example, a "Get Unstuck" behavior enables the robot to autonomously extricate itself from highly cluttered areas that may be difficult for a remote operator to handle.

Some representative behaviors and attributes that may be defined for shared mode 295 include reactive planning, get unstuck behavior, and obstacle avoidance.

Collaborative Tasking Mode

In collaborative tasking mode 296, the robot may perform tasks such as, for example, global path planning to select its own route, requiring no operator input except high-level tasking such as "follow that target" or "search this area" (perhaps specified by drawing a circle around a given area on the map created by the robot). For all these levels, the intelligence resides on the robot itself, such that off-board processing is unnecessary. To permit deployment within shielded structures, a customized communication protocol enables very low bandwidth communications to pass over a serial radio link only when needed. The system may use multiple and separate communications channels with the ability to reroute data when one or more connection is lost.

Some representative cognitive conduct and robot behaviors, and robot attributes that may be defined for collaborative tasking mode 296 include waypoint navigation, global path planning, go to behavior, retro-traverse behavior, area search behavior, and environment patrol.

Autonomous Mode

In autonomous mode 297, the robot may perform with minimal to no operator intervention 291. For behaviors in autonomous mode 297, the operator may simply give a command for the robot to perform. Other than reporting status to the operator, the robot may be free to plan paths, prioritize tasks, and carry out the command using deliberative behaviors defined by the robot's initiative.

Some representative behaviors and attributes that may be defined for autonomous mode 297 include pursuit behaviors, perimeter surveillance, urban reconnaissance, human presence detection, geological surveys, radiation surveys, virtual rail behavior, countermine operations, and seeking improvised explosive devices.

RIK Examples and Communication

Conventionally, robots have been designed as extensions of human mobility and senses. Most seek to keep the human in substantially complete control, allowing the operator, through input from video cameras and other on-board sensors, to guide the robot and view remote locations. In this conventional "master-slave" relationship, the operator provides the intelligence and the robot is a mere mobile platform to extend the operator's senses. The object is for the operator, perched as it were on the robot's back, to complete some desired tasks. As a result, conventional robot architectures may be limited by the need to maintain continuous, high-bandwidth communications links with their operators to supply clear, real-time video images and receive instructions. Operators may find it difficult to visually navigate when conditions are smoky, dusty, poorly lit, completely dark or full of obstacles and when communications are lost because of distance or obstructions.

The Robot Intelligence Kernel enables a modification to the way humans and robots interact, from a master-slave relationship to a collaborative relationship in which the robot can assume varying degrees of autonomy. As the robot initiative 299 increases, the operator can turn his or her attention to the crucial tasks at hand (e.g., locating victims, hazards, dangerous materials; following suspects; measuring radiation and/or contaminant levels) without worrying about moment-to-moment navigation decisions or communications gaps.

The RIK places the intelligence required for high levels of autonomy within the robot. Unlike conventional designs, off-board processing is not necessary. Furthermore, the RIK includes low bandwidth communication protocols and can adapt to changing connectivity and bandwidth capabilities. By reducing or eliminating the need for high-bandwidth video feeds, the robot's real-world sensor information can be sent as compact data packets over low-bandwidth (<1 Kbs) communication links such as, for example, cell phone modems and long-range radio. The robot controller may then use these low bandwidth data packets to create a comprehensive graphical interface, similar to a computer game display, for monitoring and controlling the robot. Due to the low bandwidth needs enabled by the dynamic autonomy structure of the RIK, it may be possible to maintain communications between the robot and the operator over many miles and through thick concrete, canopy, and even the ground itself.

Figure 11:
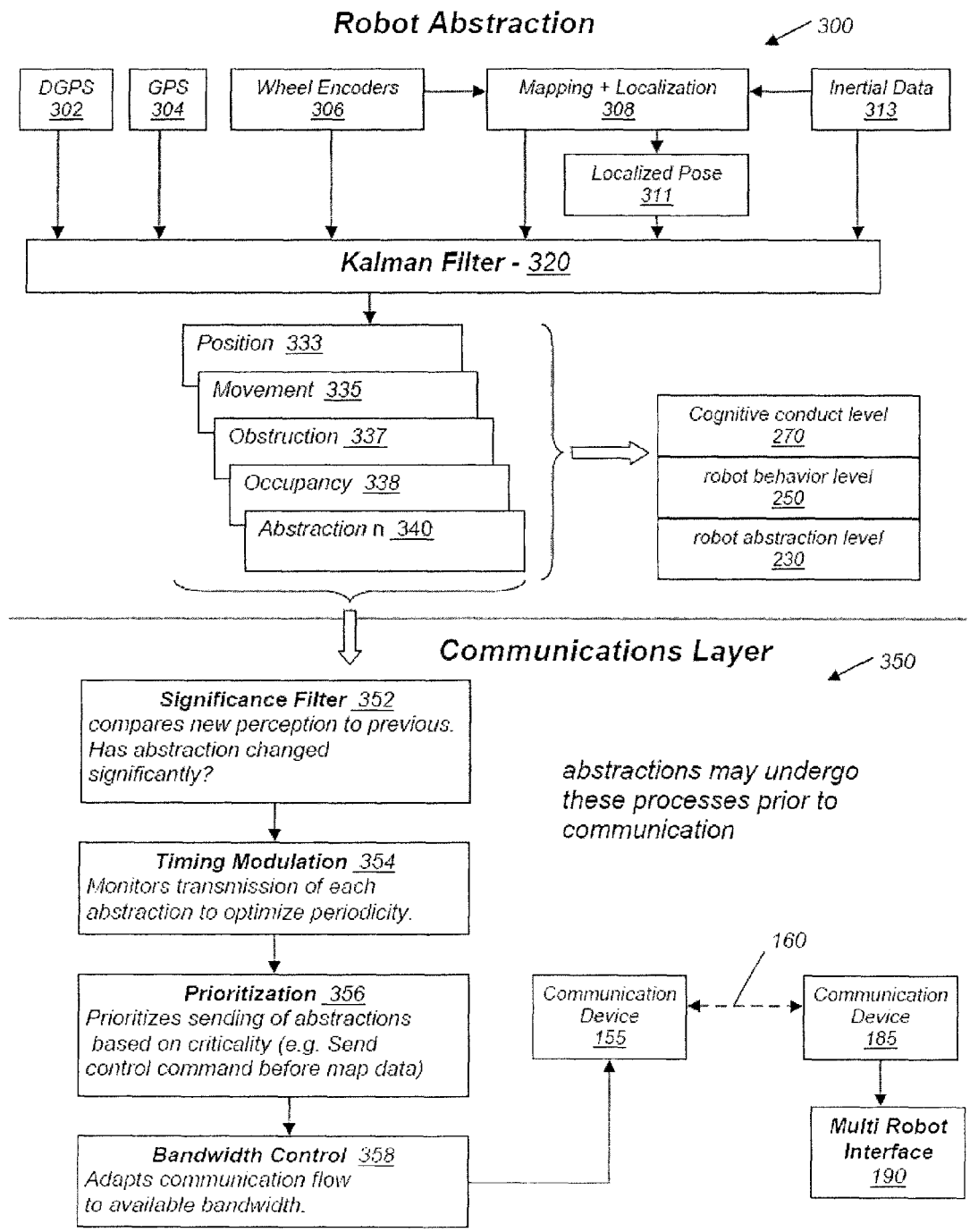
FIG. 11 illustrates a portion of representative processing that may occur in developing robot attributes and communicating those attributes.

FIG. 11 illustrates a representative embodiment of the RIK processing of robot abstractions 300 and communications operations 350 for communicating information about cognitive conduct, robot behaviors, robot attributes, and hardware abstractions to the robot controller or other robots. The upper portion of FIG. 11 illustrates the robot abstractions 300, and hardware abstractions that may be fused to develop robot attributes. In the embodiment of FIG. 11, a differential GPS 302, a GPS 304, wheel encoders 306 and inertial data 313 comprise hardware abstractions that may be processed by a Kalman filter 320. The robot attributes for mapping and localization 308 and localized pose 311 may be developed by including information from, among other things, the wheel encoders 306 and inertial data 313. Furthermore, the localized pose 311 may be a function of the results from mapping and localization 308. As with the hardware abstractions, these robot attributes of mapping and localization 308 and localized pose 311 may be processed by a Kalman filter 320.

Kalman filters 320 are efficient recursive filters that can estimate the state of a dynamic system from a series of incomplete and noisy measurements. By way of example and not limitation, many of the perceptors used in the RIK include an emitter/sensor combination, such as, for example, an acoustic emitter and a microphone array as a sensor. These perceptors may exhibit different measurement characteristics depending on the relative pose of the emitter and target and how they interact with the environment. In addition, to one degree or another, the sensors may include noise characteristics relative to the measured values. In robotic applications, Kalman filters 320 may be used in many applications for improving the information available from perceptors. As one example of many applications, when tracking a target, information about the location, speed, and acceleration of the target may include significant corruption due to noise at any given instant of time. However, in dynamic systems that include movement, a Kalman filter 320 may exploit the dynamics of the target, which govern its time progression, to remove the effects of the noise and get a substantially accurate estimate of the target's dynamics. Thus, a Kalman filter 320 can use filtering to assist in estimating the target's location at the present time, as well as prediction to estimate a target's location at a future time.

As a result of the Kalman filtering, or after being processed by the Kalman filter 320, information from the hardware abstractions and robot attributes may be combined to develop other robot attributes. As examples, the robot attributes illustrated in FIG. 11 include position 333, movement 335, obstruction 337, occupancy 338, and other abstractions 340.

With the robot attributes developed, information from these robot attributes may be available for other modules within the RIK at the cognitive level 270, the robot behavior level 250, and the robot abstraction level 230.

In addition, information from these robot attributes may be processed by the RIK and communicated to the robot controller or other robots, as illustrated by the lower portion of FIG. 11. Processing information from the robot conduct, behavior, and attributes, as well as information from hardware abstractions serves to reduce the required bandwidth and latency such that the proper information may be communicated quickly and concisely. Processing steps performed by the RIK may include a significance filter 352, a timing module 354, prioritization 356, and bandwidth control 358.

The significance filter 352 may be used as a temporal filter to compare a time varying data stream from a given RIK module. By comparing current data to previous data, the current data may not need to be sent at all or may be compressed using conventional data compression techniques such as, for example, run length encoding and Huffman encoding. Another example would be imaging data, which may use data compression algorithms such as Joint Photographic Experts Group (JPEG) compression and Moving Picture Experts Group (MPEG) compression to significantly reduce the needed bandwidth to communicate the information.

The timing module 354 may be used to monitor information from each RIK module to optimize the periodicity at which it may be needed. Some information may require periodic updates at a faster rate than others. In other words, timing modulation may be used to customize the periodicity of transmissions of different types of information based on how important it may be to receive high frequency updates for that information. For example, it may be more important to notify an operator, or other robot, of the robot's position more often than it would be to update the occupancy grid map 390 (FIG. 7).

The prioritization 356 operation may be used to determine which information to send ahead of other information based on how important it may be to minimize latency from when data is available to when it is received by an operator or another robot. For example, it may be more important to reduce latency on control commands and control queries relative to map data. As another example, in some cognitive conduct modules where there may be significant collaboration between the robot and an operator, or in teleoperation mode where the operator is in control, it may be important to minimize the latency of video information so that the operator does not perceive a significant time delay between what the robot is perceiving and when it is presented to the operator.

These examples illustrate that for prioritization 356, as well as the significance filter 352, the timing modulation 354, and the bandwidth control 358, communication may be task dependent and autonomy mode dependent. As a result, information that may be a high priority in one autonomy mode may receive a lower priority in another autonomy mode.

The bandwidth control operation may be used to limit bandwidth based on the communication channel's bandwidth and how much of that bandwidth may be allocated to the robot. An example here might include progressive JPEG wherein a less detailed (i.e., coarser) version of an image may be transmitted if limited bandwidth is available. For video, an example may be to transmit at a lower frame rate.

After the communication processing is complete, the resultant information may be communicated to, or from, the robot controller, or another robot. For example, the information may be sent from the robot's communication device 155, across the communication link 160, to a communication device 185 on a robot controller, which includes a multi-robot interface 190.

Figure 12:
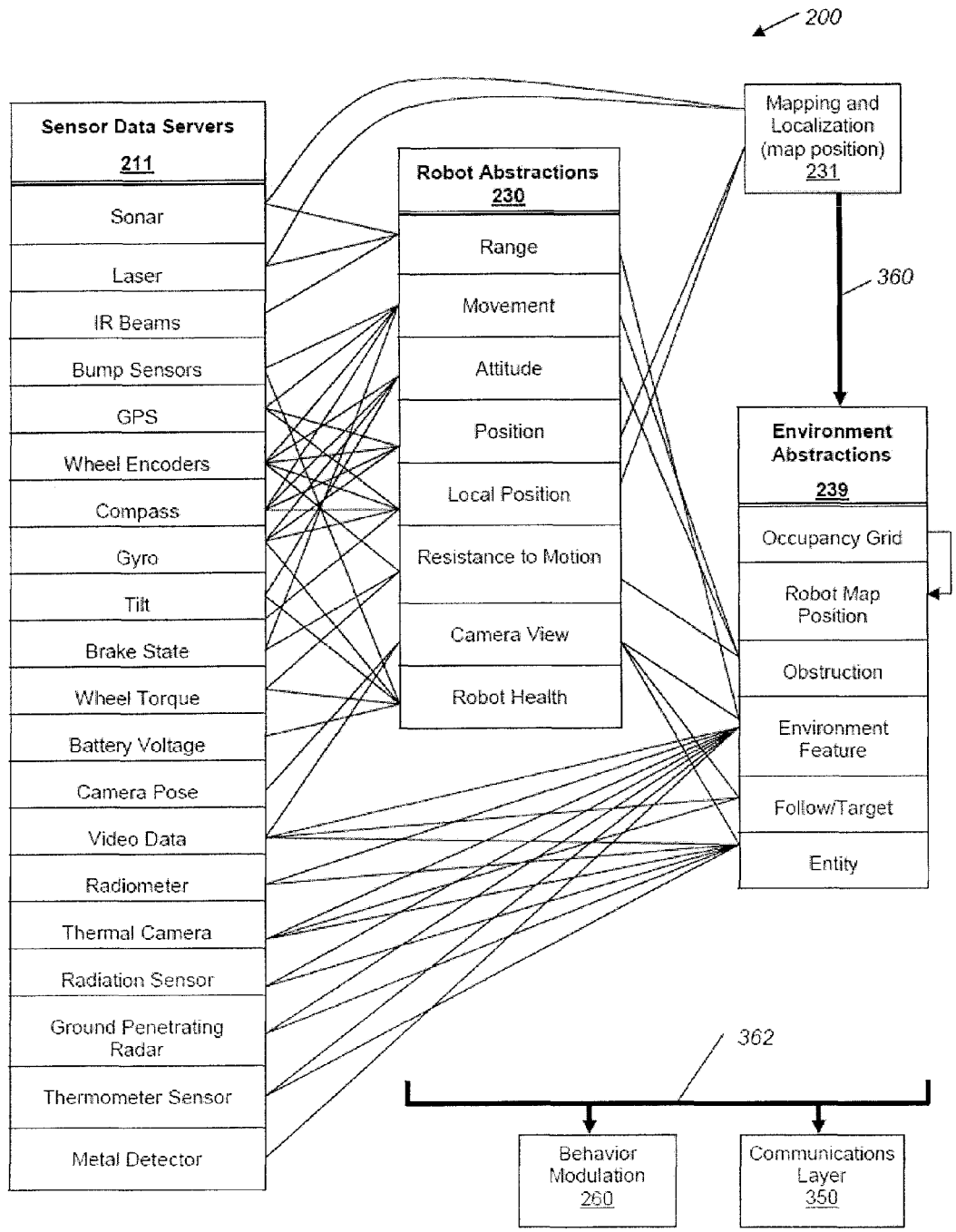
FIG. 12 illustrates a representative example of communication paths between various hardware abstractions, robot abstractions, and environment abstractions.

FIG. 12 illustrates a more general interaction between hardware abstractions, robot abstractions, environment abstractions, robot behaviors, and robot conduct. In FIG. 12, a diagram 200 of general communication between the hardware abstractions associated with sensor data servers 211 (also referred to as hardware abstractions), the robot abstractions 230 (also referred to as robot attributes), and environment abstractions 239. Those of ordinary skill in the art will recognize that FIG. 12 is intended to show general interactions between abstractions in a representative embodiment and is not intended to show every interaction possible within the GRA and RIK. Furthermore, it is not necessary to discuss every line between every module. Some example interactions are discussed to show general issues involved and describe some items from FIG. 12 that may not be readily apparent from simply examining the drawing. Generally, the robot abstractions 230 may receive and fuse information from a variety of sensor data servers 211. For example, in forming a general abstraction about the robot's current movement attributes, the movement abstraction may include information from bump sensors, GPS sensors, wheel encoders, compass sensors, gyroscopic sensors, tilt sensors, and the current brake state.

Some robot attributes 230, such as the mapping and localization attribute 231 may use information from a variety of hardware abstractions 210, as well as other robot attributes 230. The mapping and localization attribute 231 may use sonar and laser information from hardware abstractions 210 together with position information and local position information to assist in defining maps of the environment, and the position of the robot on those maps. Line 360 is bold to indicate that the mapping and localization attribute 231 may be used by any or all of the environment abstractions 239. For example, the occupancy grid abstraction uses information from the mapping and localization attribute 231 to build an occupancy grid as is explained, among other places, above with respect to FIG. 7. Additionally, the robot map position attribute may use a mapping and localization attribute 231 and the occupancy grid attribute to determine the robot's current position within the occupancy grid.

Bold line 362 indicates that any or all of the robot abstractions 230 and environment abstractions 239 may be used at higher levels of the RIK such as the communications layer 350, explained above with respect to FIG. 11, and behavior modulation 260, explained below with respect to FIG. 13.

Representative Behaviors and Conduct

The descriptions in this section illustrate representative embodiments of robot behaviors and cognitive conduct that may be included in embodiments of the present disclosure. Of course, those of ordinary skill in the art will recognize these robot behaviors and cognitive conduct are illustrative embodiments and are not intended to be a complete list or complete description of the robot behaviors and cognitive conduct that may be implemented in embodiments of the present disclosure.

In general, in the flow diagrams illustrated herein, T indicates an angular velocity of either the robot or a manipulator and V indicates a linear velocity. Also, generally, T and V are indicated as a percentage of a predetermined maximum. Thus V=20% indicates 20% of the presently specified maximum velocity (which may be modified depending on the situation) of the robot or manipulator. Similarly, T=20% indicates 20% of the presently specified maximum angular velocity of the robot or manipulator. It will be understood that the presently specified maximums may be modified over time depending on the situations encountered. In addition, those of ordinary skill in the art will recognize that the values of linear and angular velocities used for the robot behaviors and cognitive conduct described herein are representative of a specific embodiment. While this specific embodiment may be useful in a wide variety of robot platform configurations, other linear and angular velocities are contemplated within the scope of the present disclosure.

Furthermore, those of ordinary skill in the art will recognize that the use of velocities, rather than absolute directions, is enabled largely by the temporal awareness of the robot behaviors and cognitive conduct in combination with the global timing loop. This gives the robot behaviors and cognitive conduct an opportunity to adjust velocities on each timing loop, enabling smoother accelerations and decelerations. Furthermore, the temporal awareness creates a behavior of constantly moving toward a target in a relative sense, rather than attempting to move toward an absolute spatial point.

Autonomous Navigation

Autonomous navigation may be a significant component for many mobile autonomous robot applications. Using autonomous navigation, a robot may effectively handle the task of traversing varied terrain while responding to positive and negative obstacles, uneven terrain, and other hazards. Embodiments of the present disclosure enable the basic intelligence necessary to allow a broad range of robotic vehicles to navigate effectively both indoors and outdoors.

Many proposed autonomous navigation systems simply provide GPS waypoint navigation. However, GPS can be jammed and may be unavailable indoors or under forest canopy. A more autonomous navigation system includes the intrinsic intelligence to handle navigation even when external assistance (including GPS and communications) has been lost. Embodiments of the present disclosure include a portable, domain-general autonomous navigation system, which blends the responsiveness of reactive, sensor based control with the cognitive approach found through waypoint following and path planning. Through its use of the perceptual abstractions within the robot attributes of the GRA, the autonomous navigation system can be used with a diverse range of available sensors (e.g., range, inertial, attitude, bump) and available positioning systems (e.g., GPS, laser, RF, etc.).

The autonomous navigation capability may scale automatically to different operational speeds, may be configured easily for different perceptor suites and may be easily parameterized to be portable across different robot geometries and locomotion devices. Two notable aspects of autonomous navigation are a guarded motion behavior wherein the robot may gracefully adjust its speed and direction near obstacles without needing to come to a full stop and an obstacle avoidance behavior wherein the robot may successfully navigate around known obstacles in its environment. Guarded motion and obstacle avoidance may work in synergy to create an autonomous navigation capability that adapts to the robot's currently perceived environment. Moreover, the behavior structure that governs autonomous navigation allows the entire assembly of behaviors to be used not only for obstacles but for other aspects of the environment that require careful maneuvering such as Landmine detection.

The robot's obstacle avoidance and navigation behaviors are derived from a number of robot attributes that enable the robot to avoid collisions and find paths through dense obstacles. The reactive behaviors may be configured as nested decision trees comprising rules, which "fire" based on combinations of these perceptual abstractions.

The first level of behaviors, which may be referred to as action primitives, provide the basic capabilities important to most robot activity. The behavior framework enables these primitives to be coupled and orchestrated to produce more complex navigational behaviors. In other words, combining action primitives may involve switching from one behavior to another, subsuming the outputs of another behavior or layering multiple behaviors. For example, when encountering a dense field of obstacles that constrain motion in several directions, the standard confluence of obstacle avoidance behaviors may give way to the high-level navigational behavior "Get-Unstuck," as is explained more fully below. This behavior involves rules which, when activated in response to combinations of perceptual abstractions, switch between several lower level behaviors including "Turn-till-head-is-clear" and "Back out."

Countermine Conduct

One representative cognitive conduct module enabled by the RIK is a countermine process.

Figure 13A:
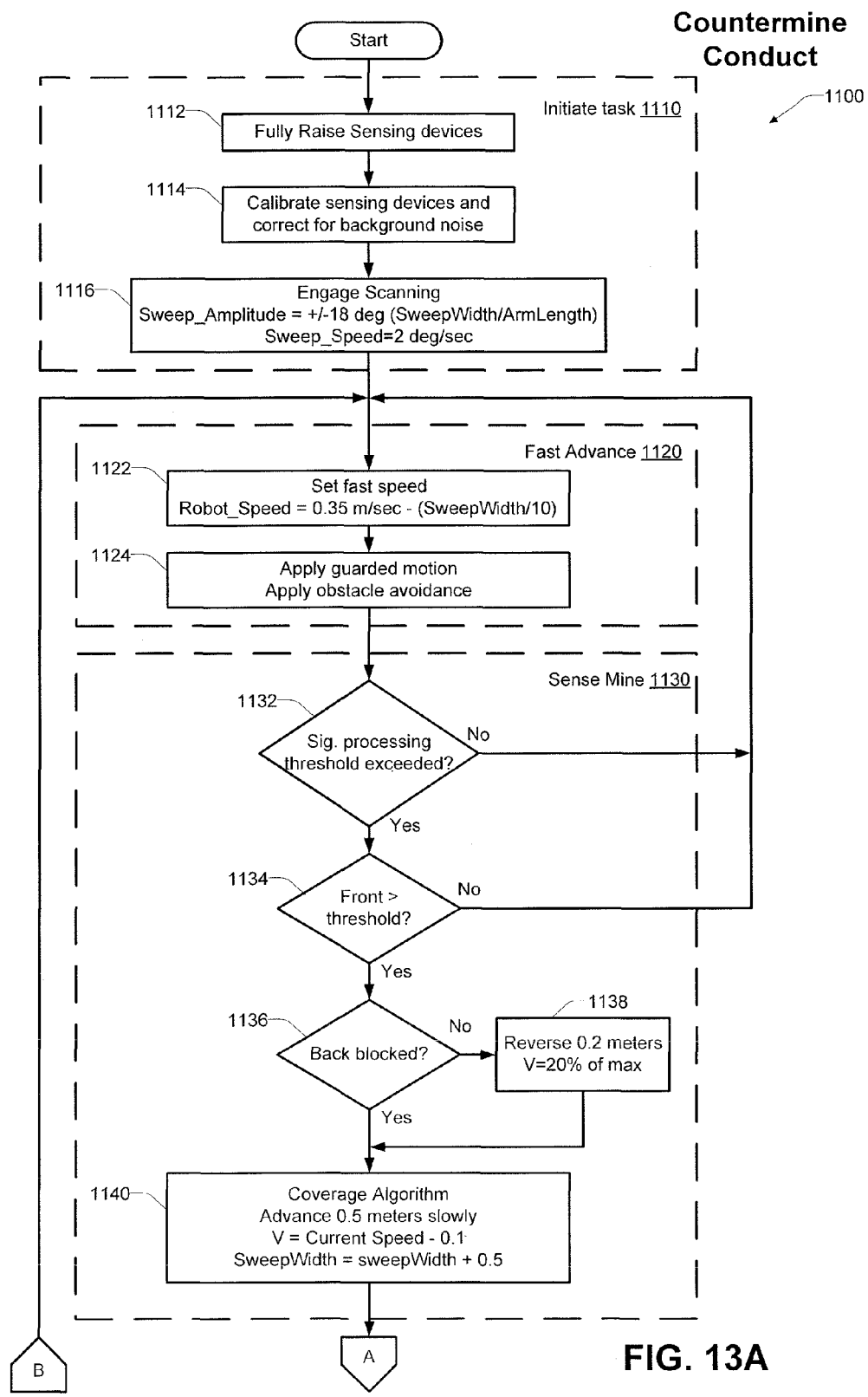
FIGS. 13A and 13B are software flow diagrams illustrating components of a countermine conduct module.
Figure 13B:
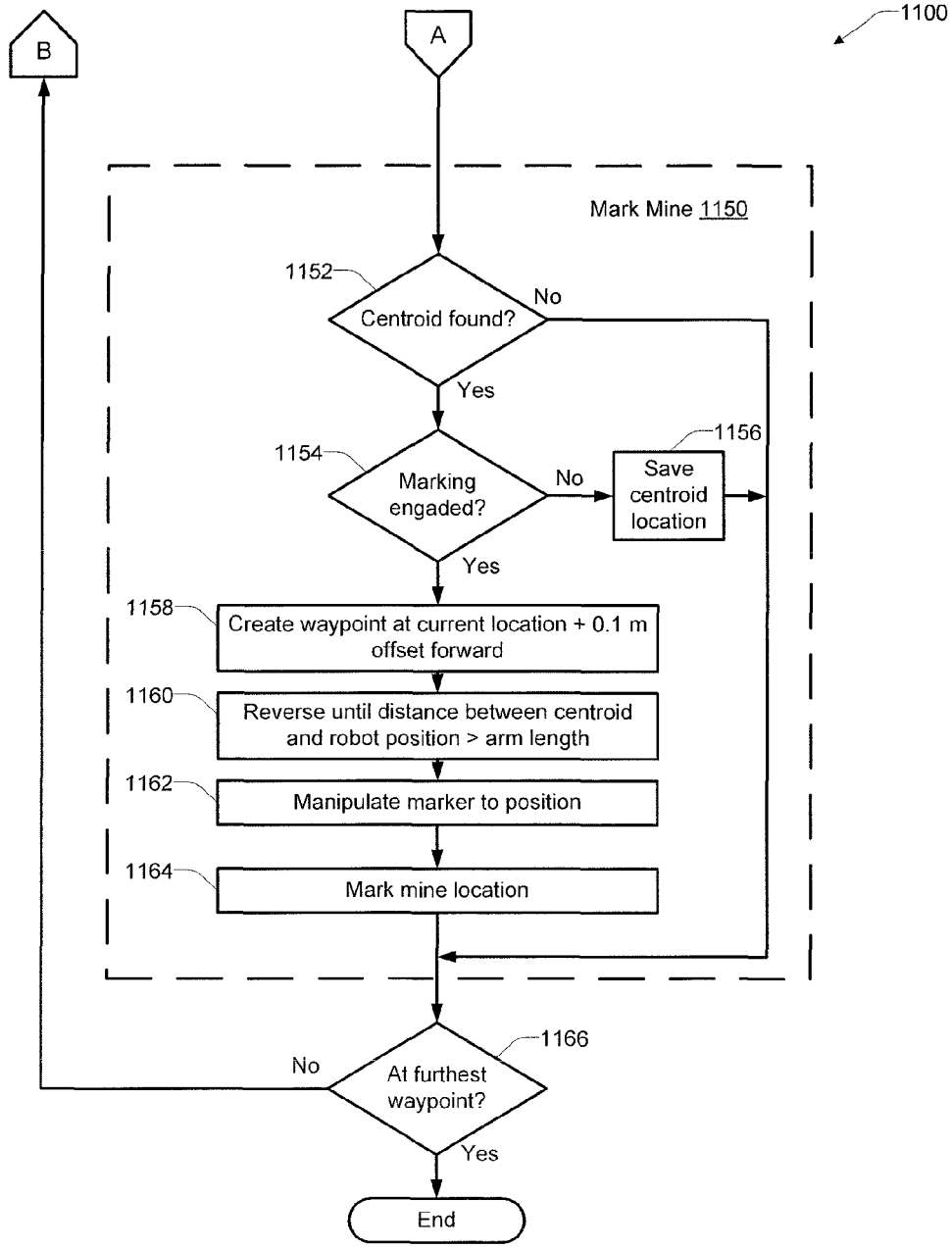

FIGS. 13A and 13B are software flow diagrams illustrating components of a countermine conduct module. Landmines are a constant danger to soldiers during conflict and to civilians long after conflicts cease, causing thousands of deaths and tens of thousands of injuries every year. Human minesweeping to find and remove mines is a dangerous and tedious job. Mine-detecting robots may be better equipped and expendable if things go wrong. The countermine conduct 1100 in FIGS. 13A and 13B illustrates a relatively autonomous conduct that may be useful for finding and marking landmines based on a predetermined path. The predetermined path may be defined as a series of waypoints, or may be simply defined as a straight path between the robot's present position and an end point. For example, the series of waypoints may be defined on a map to follow a road or to create a broad coverage of a large area. Those of ordinary skill in the art will recognize that FIGS. 13A and 13B illustrate a high-level decision and an action process. Details of many of the behaviors, such as some movements of manipulators and details of what comprises the sensing of a mine may not be described in detail. Furthermore, FIGS. 13A and 13B and the description herein may express details of geometry and function related to a specific robot implementation for explanation purposes. Embodiments of the present disclosure are not intended to be limited to these specific implementation details.

To begin the countermine conduct 1100, an initiate task 1110 is performed. Generally, this initiate task 1110 may be performed at the beginning of a countermine sweep and would thus be performed once, outside of the global timing loop.

The initiate task 1110 may include operation block 1112 to fully raise a sensing device, which may be configured for sensing landmines and may be positioned on a manipulator for placement near the ground and for generating a sweeping motion of the mine sensor in a region around the robot. Operation block 1114 calibrates the sensing device and, for example, corrects for background noise, if needed. Operation block 1116 then positions the sensing device for operation and defines sensing parameters. As an example, the representative embodiment of FIG. 13A illustrates setting a sweep amplitude, and a sweep speed for the mine sensor.

After the initiate task 1110, the countermine conduct 1100 begins a fast advance process in operation block 1120 by setting a relatively fast speed toward the first waypoint in operation block 1122. The fast advance speed may depend on many factors, such as, for example, the motion capabilities of the robot, the sweeping characteristics of the manipulator, and the sensing characteristics of the mine sensor. Generally, the robot's fast advance speed may be set relative to the sweep coverage of the manipulator to ensure sufficient coverage of the area being swept. For example, in this specific embodiment, operation block 1120 sets the robot's speed to about 0.35 meter/second–(SweepWidth/10). Thus, operation block 1120 actually determines the maximum advance rate based on scan width and scan speed to ensure 100% coverage. After setting the maximum advance rate, operation block 1124, enables the guarded motion and obstacle avoidance. One result of the fast advance process, operation block 1120, is that the maximum advance rate serves as an upper bound of allowable velocities for the guarded motion and obstacle avoidance behaviors, as explained above.

Once in the fast advance process of operation block 1120, the countermine conduct 1100 begins a process of sensing for mines 1130. Decision block 1132 tests to see if a signal-processing threshold has been exceeded. This signal-processing threshold may be set at a predetermined level indicating a potential that a mine has been sensed in the vicinity of the mine sensor. Obviously, this predetermined threshold may be a function of factors such as, for example, expected mine types, mine sensor characteristics, robot speed, and manipulator speed. If the signal-processing threshold is not exceeded, control returns to operation block 1122 to continue the fast advance process of operation block 1120.

If the signal-processing threshold is exceeded, the process tests to see if there is enough room at the present location to conduct a detailed search for the mine. Thus, decision block 1134 tests to see if the front range parameter is larger than a predetermined threshold. By way of example and not limitation, the threshold may be set at about one meter. If decision block 1134 evaluates false, indicating that there may not be enough room for a detailed search, control transfers to operation block 1122 to continue the fast advance process of operation block 1120. In this case, the process depends on the guarded motion and obstacle avoidance behaviors to navigate a path around the potential mine.

If the front range parameter is larger than a predetermined threshold, there may be room for a detailed search and the process continues. Decision block 1136 tests to see if the back of the robot is blocked. If so, operation block 1138 sets the robot to back up a predetermined distance (for example 0.2 meters) at a speed of, for example, 20% of a predetermined maximum. This movement enables the robot to perform a more accurate sweep by including in the scan the subsurface area that triggered the processing threshold. If the area behind the robot is not clear, the process continues without backing up.

Operation block 1140 performs a coverage algorithm in an attempt to substantially pinpoint the centroid of the possible mine location. In a representative embodiment, this coverage algorithm may include advancing a predetermined distance, for example 0.5 meters, at a relatively slow speed, and sweeping the manipulator bearing the mine sensor with a wider sweep angle and a relatively slow speed. Thus, the coverage algorithm generates a detailed scan map of the subsurface encompassing the area that would have triggered the processing threshold. The results of this detailed scan map may be used to define a centroid for a mine, if found.

After the detailed scan from the coverage algorithm of operation block 1140, decision block 1152 in FIG. 13B begins a process to marking the mine location 1150, which may have been found by the coverage algorithm. Decision block 1152 tests to see if the centroid of a mine has been found. If not, control transfers to the end of the mine marking process 1150. A centroid of a mine may not be found because the original coarse test at decision block 1132 indicated the possibility of a mine, but the coverage algorithm at decision block 1152 could not find a mine. As a result, there is nothing to mark.

If a centroid was found, decision block 1154 tests to see if physical marking, such as, for example, painting the location on the ground, is enabled. If not, operation block 1156 saves the current location of the sensed mine, then continues to the end of the mine marking process 1150.

If marking is engaged, operation block 1158 saves the current location of the mine, for example, as a waypoint at the current location. Next, operation block 1160 corrects the robot's position in preparation for marking the location. For example and not limitation, the robot may need to backup such that the distance between the centroid of the mine and the robot's current position is substantially near the arm length of the manipulator bearing the marking device.

With the robot properly positioned, operation block 1162 moves the manipulator bearing the marking device in proper position for making a mark. For example of a specific robot configuration, and not limitation, the manipulator may be positioned based on the equation:

$$\text{arm position} = \text{robot pose} - \arctan((\text{robot}x - \text{centroid}x)/(\text{robot}y - \text{centroid}y))$$

With the manipulator in position, operation block 1164 marks the mine location, such as, for example, by making a spray paint mark.

After completion of the mine marking process 1150, decision block 1166 tests to see if the robot has reached the furthest waypoint in the predefined path. If so, the countermine conduct 1100 has completed its task and exits. If the further waypoint has not been reached, control returns to the fast advance process 1120 in FIG. 13A.

Explosive Hazard Information Sensing, Processing, and Communication

The countermine conduct may be augmented by embodiments of the present disclosure that sense and process information related to detecting subterranean mines and communication between a mine detection system and the robot intelligence kernel. A mine detection system may have quality of data needs that require the robot to adjust its operational parameters in order for the mine detection system to meet those quality of data needs. An unmanned autonomous ground vehicle (e.g., a robot) may have safety constraints that ensure it does not traverse over a mine or leave an area unexamined. Embodiments of the present disclosure enable both the quality of data needs for the mine detection system and safety needs of the robot to be met in an environment where the two systems often have different perspectives on the same problem.

As used herein "explosive hazard" means a potentially explosive element, assembly, or device, which may be disposed on a surface of the earth or buried under the surface. Non-limiting examples of such explosive hazards are mines, pressure plate explosive devices, improvised explosive devices, and unexploded ordnance. For brevity, and because countermine is such an accepted term in the art, when a "mine" is referred to herein, it should be interpreted as an explosive device unless indicated to specifically refer to a mine or landmine.

Explosive Hazard Information Sensing and Processing

Some significant aspects of what is achieved by the countermine embodiments described herein are:

Plug-n-Play: to what extent can control systems, sensors and manipulators easily be swapped between different robotic platforms?

Autonomy: to what extent can autonomous countermine systems successfully locate and avoid mines?

Situational Awareness: to what extent can operators of autonomous countermine systems successfully deploy and interact with such systems?

Platform Mobility: to what extent can robotic countermine systems successfully traverse a range of terrains?

Marking: to what extent can robotic countermine systems accurately and reliably mark mines and safe paths?

Figure 14:
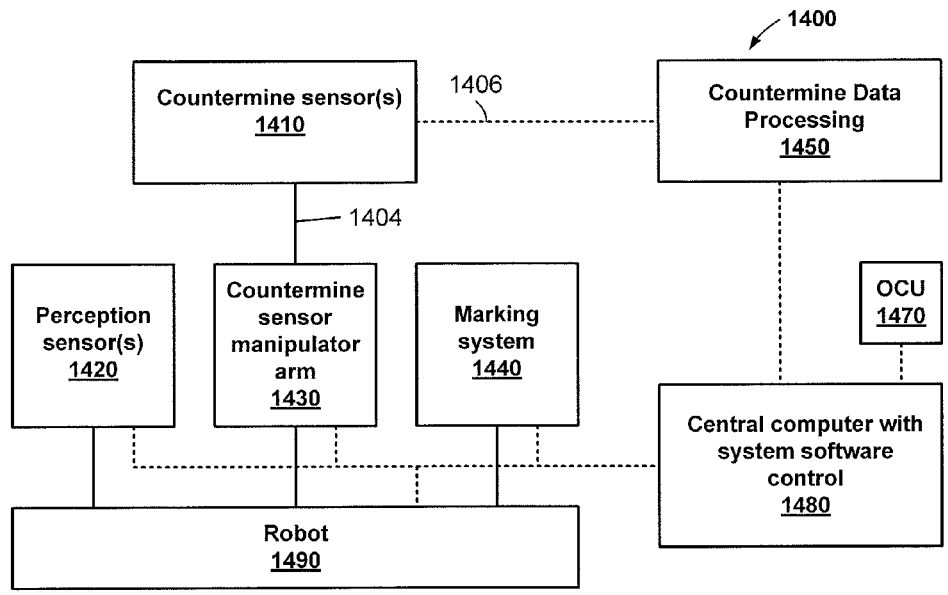
FIG. 14 is a simplified block diagram of a countermine, mobility, marking, autonomy and detection system showing some of the hardware and software modules useful in mine detection.

FIG. 14 is a simplified block diagram of a countermine, mobility, marking, autonomy, and detection system showing some of the hardware and software modules useful in mine detection of a countermine system 1400. Physical connections between various modules are indicated by solid lines 1404 and data connections are indicated by dashed lines 1406. For physical connections 1404, a robot 1490 may have connected thereto, various perceptions sensors 1420 as described above, a manipulator arm 1430, and a marking system 1440. Countermine sensors 1410 may be physically connected to the manipulator arm 1430.

For data connections 1406, the perception sensors 1420, the manipulator arm 1430, the marking system 1440, and the robot 1490 itself may be coupled to a central computer 1480. The countermine sensors 1410 may be connected to a countermine data processing module 1450, which may be in communication with the central computer 1480. An operator control unit (OCU) 1470 may be included and coupled to the central computer 1480 to provide a user interface for the operator to control and direct tasks and functions of the robot 1490.

The marking system 1440 may be used as a way to mark the ground where a mine may have been detected. As a non-limiting example, the marking system 1440 may spray a vegetable dye on the ground in the appropriate spot. In some embodiments, a marking system 1400 may not be included and the location of the mines may be maintained in maps of the environment as they are developed by the countermine system 1400.

The manipulator arm 1430 may be configured as a system for moving the countermine sensors 1410 relative to the robot 1490. As a non-limiting example, the manipulator arm 1430 may sweep in an arc in front of the robot 1490.

The countermine sensors 1410 may be sensors useful for detecting improvised explosive devices and mines that may be on or near the surface as well as buried beneath the surface. As non-limiting examples, the countermined sensors 1410 may include metal detectors such as electromagnetic induction (EMI) detectors, ground penetrating radar (GPR) sensors, and other suitable sensors.

Future fielded countermine systems 1400 may use more advanced countermine sensors 1410, manipulator arm 1430 with more degrees of freedom, new robot 1490 embodiments, and different perception sensors 1420. In addition, such systems will likely have very different user interfaces. However, these future systems will still have similar requirements that are met by embodiments of the present disclosure. As non-limiting examples, countermine systems 1400 need to be able to navigate autonomously, detect and mark mines in real time, and avoid mines and aboveground obstacles. In terms of types of components, countermine systems 1400 will likely consist of a robotic vehicle equipped with sensors required for navigation and marking, an OCU 1470 for tasking and visualization, one or more countermine sensors 1406 (likely having both GPR and EMI sensing modalities), a countermine sensor manipulator arm 1430, and a number of integrated software packages which provide for real time processing of the countermine sensor data as well as control of the robotic vehicle.

As a result, while the underlying hardware, software and implementation of the functionality may be different in future countermine systems 1400, the architecture described herein should still be useful and applicable in countermine applications.

Figure 15:
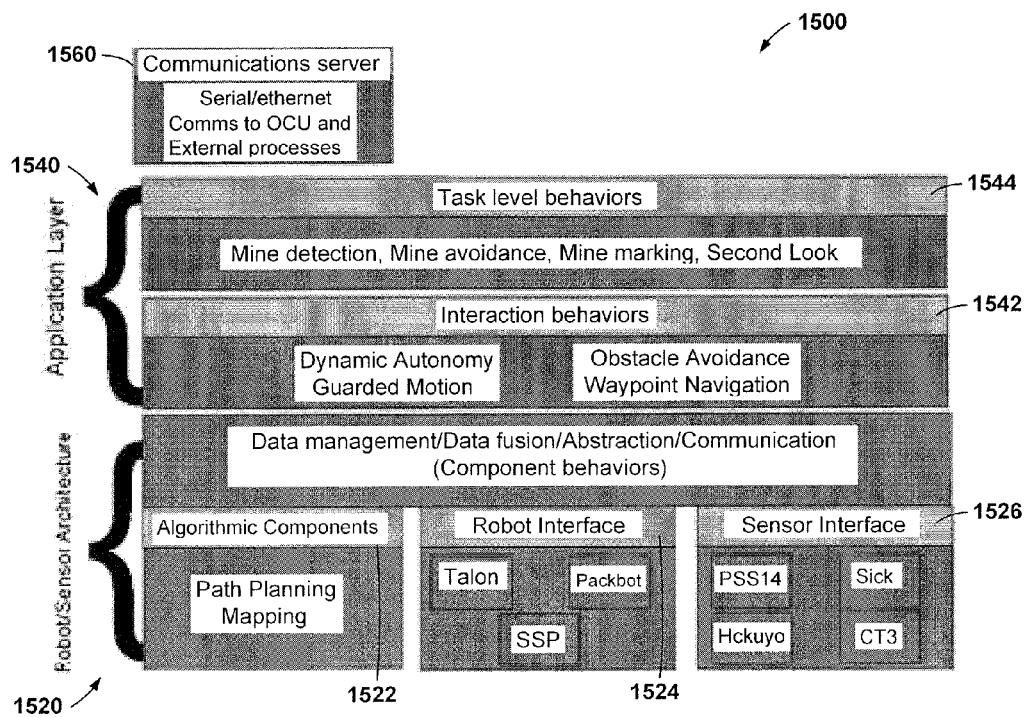
FIG. 15 is a simplified block diagram of a software architecture of a robot Intelligence Kernel including some elements useful in mine detection systems.

FIG. 15 is a simplified block diagram of a software architecture 1500 of the Robot Intelligence Kernel (RIK) including some elements useful in mine detection systems. FIG. 15 is similar to FIG. 3 except recast to focus on countermine applications.

A communication server 1560 may include capabilities for communications between the OCU 1480 and the RIK, communications between the RIK and other processes, and communications between the RIK and a Explosive hazard Sensor Processing Module (ESPM).

An application layer 1540 may include task level behaviors 1544, such as, for example, explosive hazard detection, explosive hazard avoidance, explosive hazard marking, and a second look behavior as discussed below. The application layer 1540 may also include interaction behaviors 1542, such as, for example, dynamic autonomy adjustments, obstacle avoidance, guarded motion, and waypoint navigation.

A robot and sensor layer 1520 define component behaviors and may include algorithmic components 1522, such as, for example, path planning and map generation. The robot and sensor layer 1520 may also include robot interface components 1524, such as, for example, interfaces to specific types of third party unmanned autonomous vehicles. The robot and sensor layer 1520 may also include sensor interface components 1526, such as, for example, interfaces to specific types of third party sensors.

Task level behaviors 1544 are a category of coordinated robot-sensor-actuator behaviors that are the product of a task analysis breakdown of the application domain or mission space the robot is being deployed in. The task level behaviors tie together both the tactical and component behaviors into an intelligent series of high and low level events to accomplish a phenomenon. New task level behaviors used in the countermine system 1400 (FIG. 14) include, for example, "detect, mark and avoid mines" and "detect and mark mines in an overpass mode."

Interaction behaviors 1542 are the class of behaviors that are associated with the different interaction modes for robotic system navigations. Four robot modes of tactical control may be available for the RIK. These modes correspond to increasingly higher levels of robot autonomy. As discussed above with relation to FIGS. 10A and 10B, these autonomy modes include teleoperation mode, safe mode, shared mode and collaborative tasking mode. The robot is always in one of these modes, and that the modes are mutually exclusive. In addition, both the robot and the operator can change modes. However, in general the robot only lowers the autonomy level (e.g., when the robot is not able to execute a mission, it will pass control to the operator by going for example from shared mode to safe mode). These RIK interaction modes (and the underlying and associated behaviors) have empirically shown the ability to reduce remote operator workload and improve system user performance when used for search and detection or reconnaissance missions. Behaviors discussed above may be expanded and improved for countermine operations. One example of this expansion is the inclusion of mines as obstacles in both the obstacle avoidance and path planning behaviors.

Component level behaviors 1520 are behaviors that are used by the task level and the tactical behaviors. They are typically behaviors which can be abstracted (such as calibrate sensor, detect mines, mark a mine). These behaviors may be used to fulfill the task level and tactical behaviors. While they require a hardware specific implementation, as these tasks are abstracted it is relatively simple to enhance the underlying implementation while leaving the task level behaviors the same. A typical component level behavior 1520 is an asynchronous process that is the result of a series of coordinated events between the robotic platform and a sensor or actuator defined within the robot-sensor architecture. An example of a component behavior is mine sensor calibration, which requires a series of sensor switch manipulations, SSP (Sensor Scanner Payload) actuations, and robot movements into a coordinated series of events that mimic human actions used to perform the calibration routine. Other component behaviors that may be implemented include, for example, a marking behavior (which may require coordination between the robot, the SSP, and the marking system), the detection, and the terrain following behavior (which may require interplay between a scrolling height map and the SSP).

In general, software components operate in an integrated manner through well-defined interfaces. These software components may include; (1) Software that orchestrates and controls the system and orchestrates the interaction between the components of the system (2) OCU software (i.e., the software that runs on the OCU 1470 hardware FIG. 14), which may run as, for example, a computer with conventional Windows software and (3) Countermine data processing software. The countermine software is generally described as an Explosive hazard Sensor Processing Module (ESPM) and includes a structured message passing protocol for interfacing with the RIK software processes.

The OCU software and ESPM software have clearly defined roles. However, the RIK software must be configured to perform and coordinate a multitude of roles. As non-limiting examples, these roles may include; (1) Hardware control role: Control the behavior of the physical hardware (robot, marking system, sensor manipulator arm), (2) Mapping role: Receive and process the data from the perception sensors to build up a representation of the environment, (3) Coordinator role: Data fusion, management and abstraction as well as orchestration of communication between all the components, and (4) Autonomy role: path planning and execution, obstacle avoidance and mine detection specific behaviors (second look, marking and avoidance).

The OCU 1470 (FIG. 14) may be a standalone component and may be configured to provide a membrane for human interaction with an RIK enabled robotic system. With RIK enabled robotic systems, the intelligent control capabilities reside on the robotic platform itself. The OCU 1470 communicate with a RIK enabled platform via the RIK communication server 1560 to offer the ability for users to command and query the robotic platform. In the case of the countermine system 1400, the OCU 1470 may include a 3D graphical user interface that runs on a standard PC with a MICROSOFT WINDOWS® operating systems. The 3D graphical user interface provides methods for commanding the robot platform utilizing any of the levels of autonomy described above.

Figure 16:
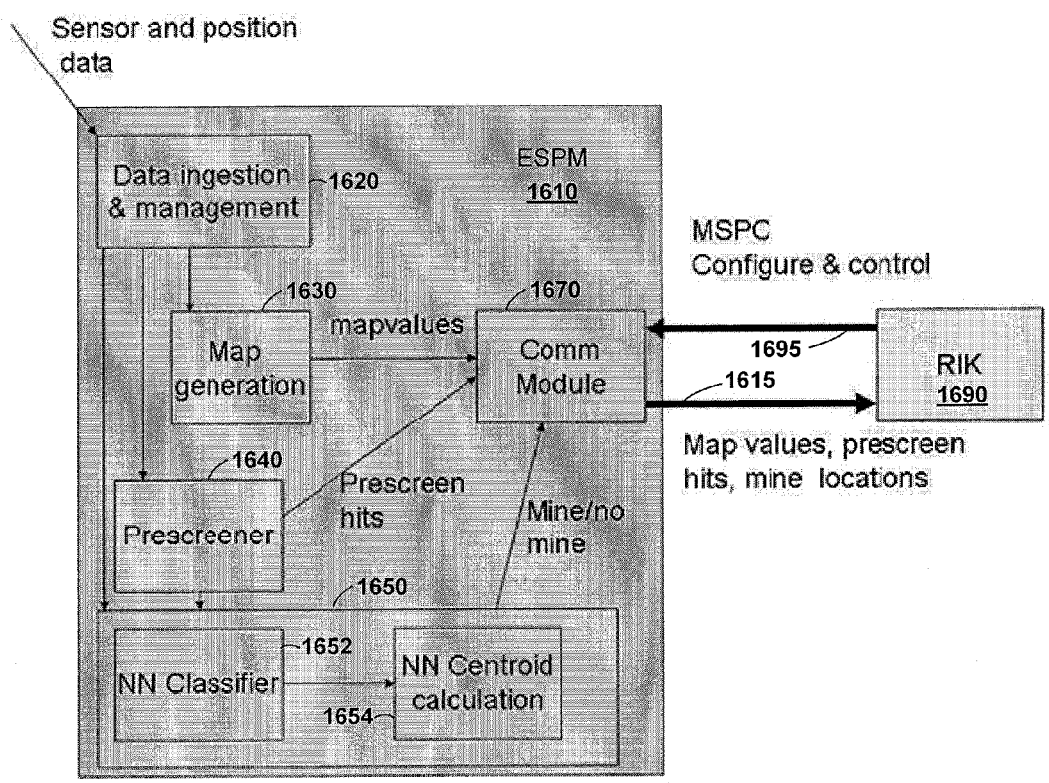
FIG. 16 is a simplified block diagram illustrating some of the software functions performed by the ESPM and communication with the RIK.
Figure 17A:
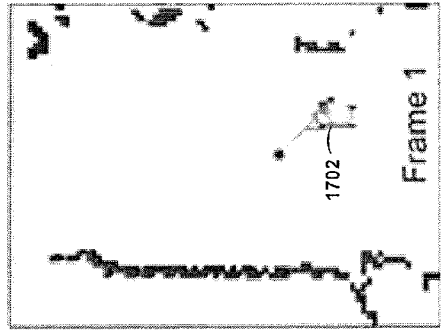
FIGS. 17A-17H are a series of screenshots from a user interface showing operations during various modes of mine detection.
Figure 17B:
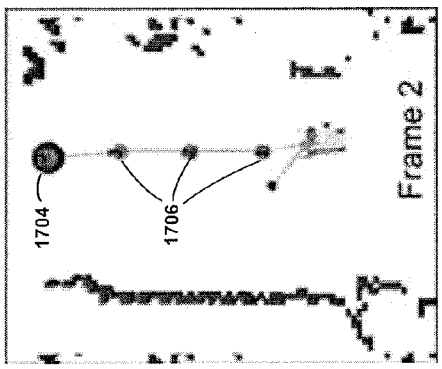
Figure 17C:
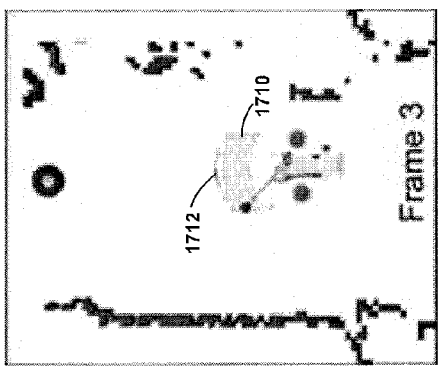
Figure 17D:
Figure 17E:
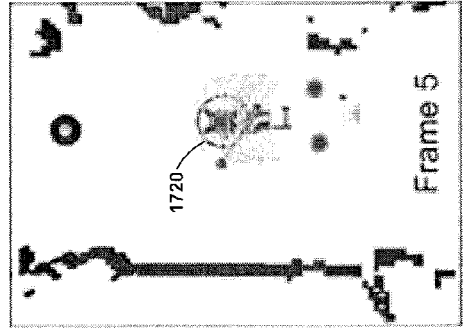
Figure 17F:
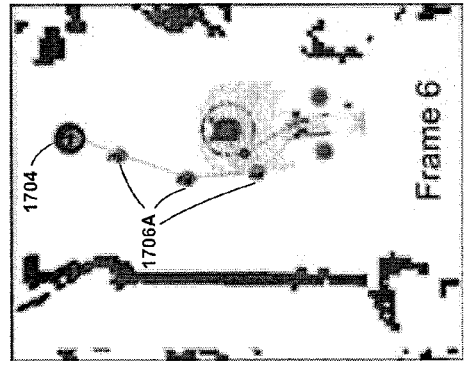
Figure 17G:
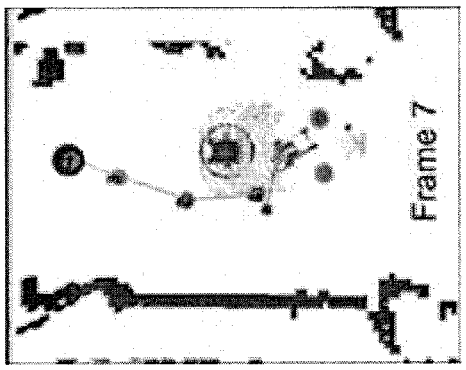
Figure 17H:
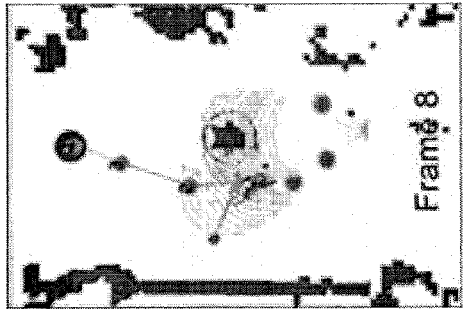

FIG. 16 is a simplified block diagram illustrating some of the software functions performed by the ESPM and communication with the RIK. The RIK 1690 and the ESPM 1610 communicate with messages such as ESPM bound messages 1695 and RIK bound messages 1615 as discussed in detail below. The ESPM 1610 may be various modules, such as, for example, data ingestion and management 1620, map generation 1630, a characterization module 1650, and a communications module 1670.

The data ingestion and management module 1620 may be configured to maintain relevant data in memory in a rapidly accessible map and discard the data when it is no longer needed. The spatial map generation module 1630 may be configured to create information for display of "raw" sensor readings in the OCU interface as the robotic system progresses. This visualization may be in the form of a map that shows subsurface features in an image similar to a photograph for easy operator perception.

The prescreener 1640 looks for perturbations in the mine sensing data and keeps running knowledge of the subsurface. If interesting changes occur, the prescreener 1640 triggers an event has a hit, that may indicative of a presence of a mine. The prescreener 1640 may uses real time calculated statistics of data streams from the data ingestion and management module 1620 to decide whether a prescreener hit is warranted.

Once a prescreener hit has been declared, the characterization module 1650 is engaged. The characterization module 1650 performs pre processing of the data stream and uses a standard neural network classifier 1652 (trained on a dataset with known threat locations) to determine the confidence of a signal being associated with a threat. The results of this classification may be used by a neural network based centroid calculator 1654 to determine if a centroid exists, and if so, if this centroid is stable. Once a stable centroid has been found, it is communicated to the RIK 1690 through the communication module 1670, which sends the information on the RIK 1690 to take appropriate action. It should be noted that because of the modular software structure of the ESPM 1610 it is trivial to either accommodate other sensor data than the ones described herein, or to accommodate different prescreeners, threat classifiers or centroid calculators. Moreover, the classification may be configured to identify and report on different types of explosive hazards, such as, for example, mines, pressure plate explosive devices, improvised explosive devices, and unexploded ordinance.

The communication module 1670 receives information from the map generation 1630, the prescreener 1640 and the characterization module 1650 and sends the information to the RIK 1690 as RIK bound messages 1615.

It should be noted that the ESPM may be configured as software running on its own processor or controller. In addition, some of the modules may include features in embedded in software, firmware, hardware and combinations thereof.

In some embodiments, both the ESPM and the RIK may run as separate processes on a single computer or processor and communication therebetween with the messages described below. In other embodiments, the ESPM and the RIK may execute on separate processors but can still use the same messages and message passing protocols. Communication may use any conventional protocol and interface, such as, for example, Transmission Control Protocol/Internet Protocol (TCP/IP), User Datagram Protocol (UDP), RS-232 and RS-485.

FIGS. 17A-17H are a series of screenshots from a user interface showing operations during various modes of mine detection. Frame 1 illustrates the start of the countermine mission. The sensor has been calibrated by a system operator and a robot 1702 is waiting for tasking by the operator.

Frame 2 illustrates that the system operator has given the robot a goal 1704, the robot's path planning algorithm analyzed the environment and calculated the interstitial waypoints 1706 for achieving the operator-defined goal 1704.

Frame 3 illustrates the countermine system generating a scanning pattern 1710 by moving the arm through an arc and moving the robot forward. The ESPM prescreener has triggered (e.g., on an EMI signal 1712 above a predefined threshold calculated based on calibration data) and communicates a prescreener message to the robot. Upon receiving the prescreen hit, the robot retracts the goal point and launches a second look behavior.

Frame 4 illustrates the robot characterizing the subsurface during the second look behavior. Note that the width of the sensor scanning patter 1710 has widened and the resolution of the EMI data 1712 has become denser.

Frame 5 illustrates that the ESPM classified a mine location 1720 and articulated the mine location 1720 to the robot. The robot may then exit the second look behavior, communicates the mine location to the OCU and adds the mine as a virtual obstacle. The robot may mark the mine location at this point.

Frame 6 illustrates that with the mine located and marked, the operator's original goal point is re-established. The path planning algorithm identified the added mine location and calculated a new series of waypoints 1706A around the detected mine location.

Frames 7 & 8 illustrate the robot continuing with the countermine mission following the mine detection event.

These results show an example of a successful autonomous performance of the robotic countermine system. In addition to the described capabilities, there are obviously numerous other aspects (such as sensor terrain following, environmental sensing and positioning) that may be required.

Figure 18:
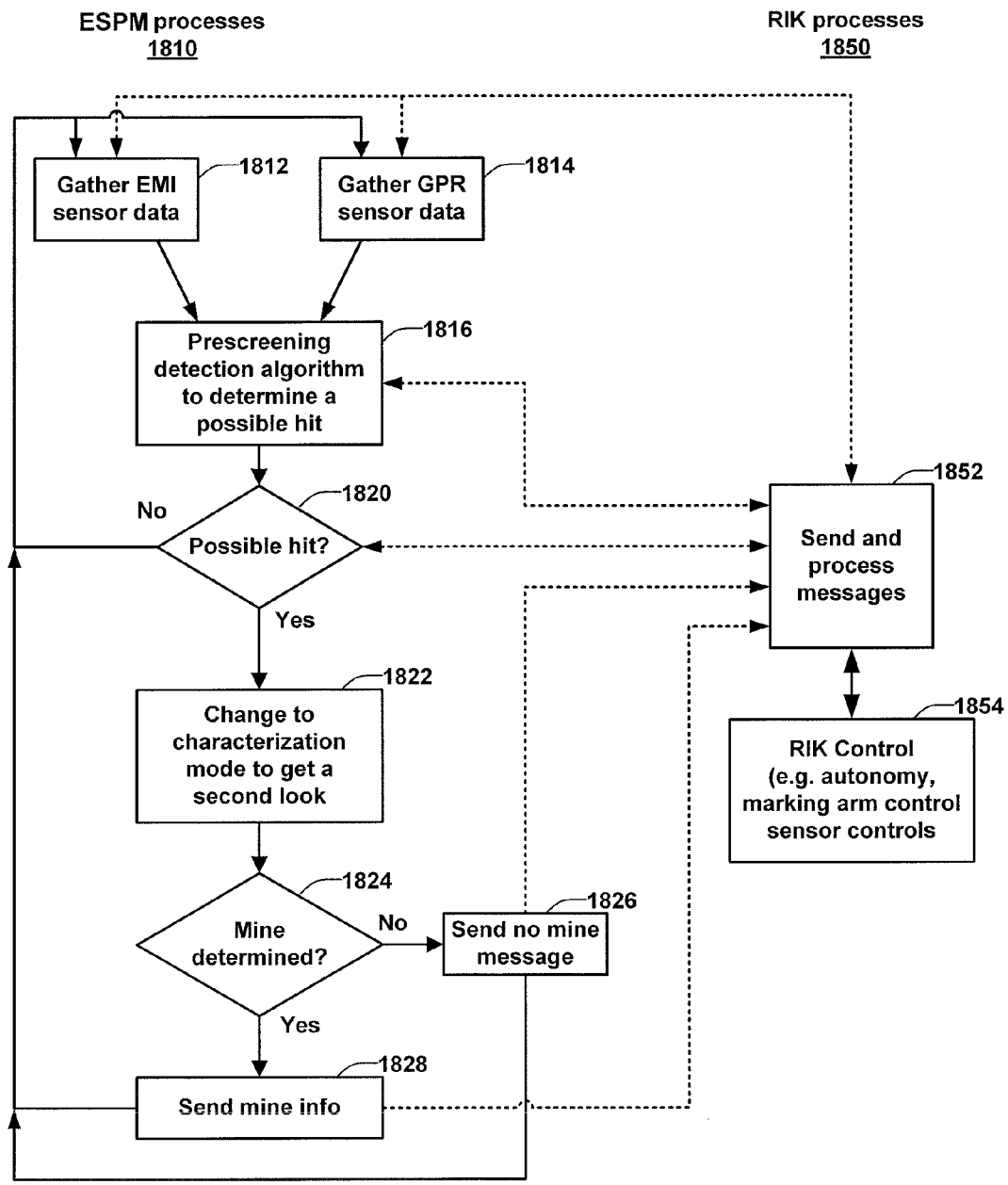
FIG. 18 is a flow diagram showing some operations performed during mine detection.

FIG. 18 is a flow diagram showing some operations performed during mine detection. ESPM processes 1810 are illustrated on the left side and RIK processes 1850 are illustrated on the right side. General message passing between the ESPM and the RIK is illustrated with dotted lines and transitions between blocks are illustrated with solid lines. The RIK may generally include RIK control processes 1854, such as, for example, autonomy level transitions, marking, arm controls, and sensor controls. Operation block 1852 illustrates a general process for sending and receiving messages between the RIK and the ESPM.

For the ESPM processes 1810, operation block 1812 indicates that the ESPM may continually gather and process EMI data. Operation block 1814 indicates that the ESPM may continually gather and process GPR data. Operation block 1816 indicates that EMI data, GPR data, or both may be used in the prescreening algorithm to determine if there is a possible hit on a mine, as indicate by decision block 1820. If there is no hit, the process loops to gather more data and prescreen for hits.

If there is a possible hit, operation block 1822 indicates that the ESPM enters a characterization mode to gather and process more data in order to gain more confidence that a mine is present. If a mine is detected, as indicated by decision block 1824, operation block 1828 indicates that information about the mine is sent to the RIK. If a mine is not detected, operation block 1826 indicates that a message indicating no mine is sent to the RIK.

After a message is sent from either operation block 1826 or operation block 1828, the process loops back to gather more data and prescreen for hits.

Figure 19:
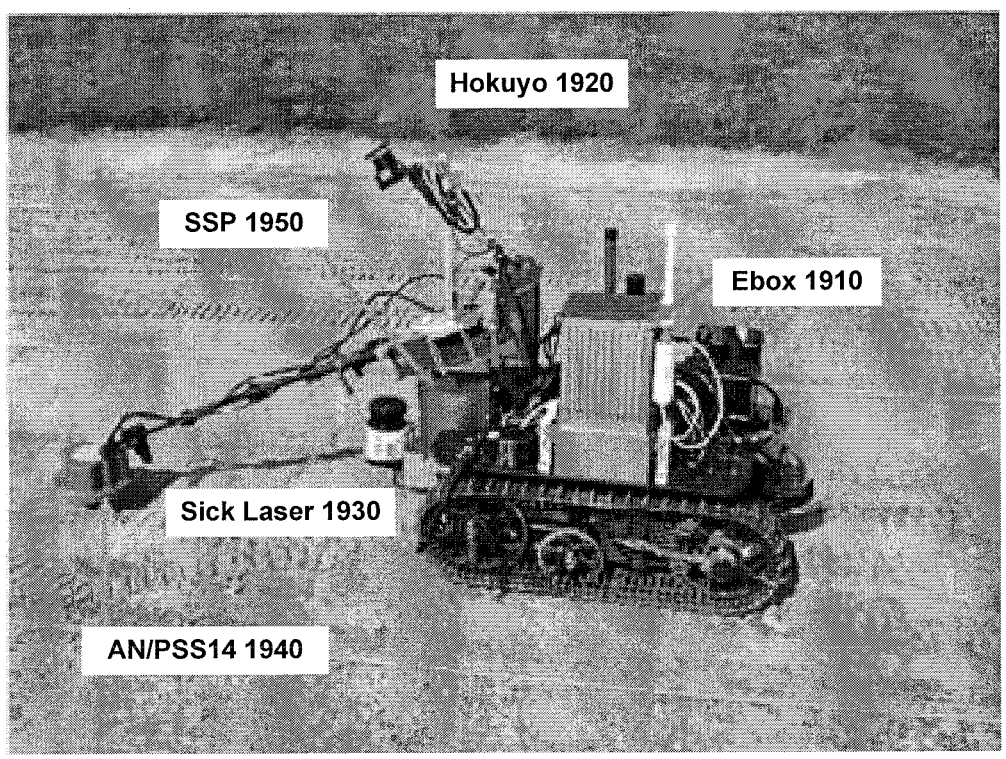
FIG. 19 is a photograph of a robot as an example of an embodiment for mine detection.

FIG. 19 is a photograph of a robot as an example of an embodiment for mine detection. An Ebox 1910 may be configured to include all the computational payloads for both the ESPM and the RIK. In this case communications are back and forth between two processes within this processing system.

A Hokuyo 1920 and sick laser 1930 may be used for used for obstacle detection and avoidance. An AN/PSS14 sensor 1940 is a mine detection sensor package and the Sensor Scanner Payload (SSP) 1950 is a 2-degree-of-freedom actuating arm that may be controlled by the RIK.

Many different physical systems have been used during evaluation of the countermine system 1400 described herein. These systems differ in robotic platform, countermine sensor and position sensors and were used to investigate different aspects of each of the critical interest functions. The table below illustrates configurations for these different systems.

between the RIK and the ESPM includes a message passing protocol that can optimize quality of data issues important to the ESPM and safety and operational issues important to the RIK.

The ESPM may be configured in at least five different modes, a standby mode, a calibration mode, an explosive hazard detection mode (also referred to herein as a mine detection mode), an explosive hazard characterization mode (also referred to herein as a mine characterization mode), and a map value mode.

The standby mode is a startup mode. In standby the ESPM may be listening to data from the sensors and may use this data to send out a status of the sensors to the RIK. However, data storage and data processing generally do not occur in the standby mode.

In the calibration mode, the ESPM collects calibration data from the sensors such as, for example ground penetrating radar, electromagnetic induction and other types of sensors useful for detecting geophysical anomalies.

In the mine detection mode, the ESPM will process the data from the mine sensor in real time and send messages to the RIK related to the real time sensing and processing. These messages may be in the form of map value (MV) messages and suspected mine hit (MH) messages. During the mine detection mode the ESPM may be performing a prescreening process looking for perturbations in subsurface information that may be indicative of a mine and may be a candidate for a second look.

In the mine characterization mode, the ESPM may take a second look at the area that may be indicative for the presence of a mine. In this mode the ESPM will process more detailed data from the mine sensor in real time and send messages to the RIK related to the real time sensing and processing of the detailed data. These messages may be in the form of map value (MV) messages and mine location (ML) messages. During the mine characterization mode the ESPM may be performing a second look process to perform more detailed processing of subsurface information that may be indicative of a mine. For example, the resolution of image information from sensors may be increased, the mine sensor may sweep or

| System name | Robot | RIK on board | Threat Sensor | SSP (Sensor Scanner Package) | E-Box (Interface and Embedded Computer) | Perception sensors | Position sensors |
|---|---|---|---|---|---|---|---|
| NIITEK system | Foster Miller Talon | Yes | NIITEK CT3 | No | No | No | IMU GPS |
| Spawar Talon | Foster Miller Talon | No | None | Simulated SSP (same formfactor/weight) | No | No | IMU GPS |
| Spawar packbot | Irobot Packbot | No | None | Simulated SSP and simulated FIDO (same formfactor/weight) | No | No | IMU GPS |
| Countermine Talon | Foster Miller Talon | Yes | Cyterra ANPSS 14 | Yes | Yes | Hokuyo + Sick Rangefinders | Encoders + IMU |
| Explosive detection Talon | Foster-Miller Talon | Yes | ICX Nomadics FIDO | Yes | Yes | Hokuyo + Sick Rangefinders | Encoders + IMU |
| Countermine Packbot | Irobot Packbot | Yes | Cyterra ANPSS14 | Yes | Yes | Hokuyo + Sick Rangefinders | Encoders + IMU |
| Explosive detection Packbot | Irobot Packbot | Yes | ICX Nomadics FIDO | Yes | Yes | Hokuyo + Sick | Encoders + IMU |

Communication Between Mine Information Processing and RIK

Automated mine detection on a robotic platform requires a tight integration between mine sensors, data processing, robot behavior, and robot control. Therefore, communication slowly and in a wider arc, and the robot may move more slowly. As part of this process, the mine characterization mode may determine a confidence level that the detected anomaly is a mine and classify the device, such as, for example, a pressure plate device or a land mine.

In the map value mode, the ESPM may send out map value (MV) messages but not perform any detailed mine detection. This mode may be useful for a general surveying of subsurface features such as, for example, buried mine caches and tunnels.

Within each of these five modes, the ESPM may have different settings and operational parameters for sensors, sensor arm positions, and robot positions. In general, these options may be determined by the RIK.

Mode changes are generally controlled by the RIK, except for the change between the mine detection mode and the mine characterization mode, which may be done independently by the ESPM or under direction from the RIK.

As a non-limiting example, messages may be passed between the RIK and ESPM using TCP/IP. In some embodiments, the ESPM may be configured as a server, and the RIK may be configured as a client. Messages pass in both directions between the RIK and the ESPM and designated as ESPM bound messages and RIK bound messages.

ESPM bound messages originate with the RIK and are of two general types.

Control messages set parameters of the ESPM, change the state of the ESPM, request the ESPM to perform specific actions, and combinations thereof. Acknowledgement messages acknowledge certain messages from the ESPM by echoing the messages back. As non-limiting examples, the RIK may send acknowledgement messages for suspected mine hit (MH) messages and mine location (ML) messages.

The ESPM bound control messages may include messages, such as, for example; MD—Mine Detection, MC—Mine Calibration, ME—Mine sensor Elevation, MP—Mine processor Parameter settings, MS—Mine Search, MM—Mine Message, and MO—Mine Mode changes.

As non-limiting examples, mine detection (MD) messages may include commands for starting mine detection, ending mine detection, entering a standby state for mine detection, and resuming mine detection.

As non-limiting examples, mine calibration (MC) messages may include commands for starting detailed mine calibration, ending detailed mine calibration, starting quick mine calibration, ending quick mine calibration, starting ground penetrating radar calibration, ending ground penetrating radar calibration, starting metal detector calibration, ending metal detector calibration, starting a noise canceling process and ending the noise canceling process.

As non-limiting examples, mine sensor elevation (ME) messages may include commands for starting sensor height data collection and evaluation, sending requested sensor height, and stopping sensor height data collection and evaluation.

As non-limiting examples, mine processor parameter (MP) messages may include commands for requesting status of the sensors, requesting a start of data broadcasts from the ESPM, requesting a stop to data broadcasts from the ESPM, saving the state of the ESPM to disk or other long term storage media, requesting a stop to the state saving, setting grid dimensions for the map value grid, and designating areas for the ESPM to ignore, in which the ESPM does not need to look for mines or specific targets.

As non-limiting examples, mine search (MS) messages may include commands for forcing an end to detailed characterization mode, which may be given when the ESPM is in mine characterization mode, and the robot is close to driving over the location of the prescreener hit. This forces the ESPM to declare a mine or not a mine based on data collected to this point. Commands may also include, a request to standby, and a request to continue characterization mode.

As non-limiting examples, mine mode change (MO) messages may include commands for setting the ESPM to map value mode, disable mine detection behavior, and set other varies parameters a and test modes in the ESPM.

RIK bound messages originate with the ESPM and are of three general types. Action messages request the RIK to perform specific actions. Data messages send information to the RIK. Acknowledgement messages acknowledge certain messages from the RIK by echoing the messages back. As non-limiting examples, the RIK may send acknowledgement messages for suspected mine hit (MH) messages and mine location (ML) messages.

The RIK bound action messages may include messages, such as, for example, MC-Mine Calibration messages to request the RIK to perform certain calibration tasks and MT-triggering commands to request the RIK to trigger certain processes. The RIK will react to these requests by sending back the appropriate Start/End commands. For example, prior to actually executing the quick cal, the RIK will send a MD:STBY so that no data are being processed. After quick cal completion, the RIK will send a MD:RST.

As non-limiting examples, mine calibration (MC) messages may include requests to perform a quick calibration, perform ground penetrating radar training, perform noise cancellation, and perform electromagnetic induction device calibration.

As non-limiting examples, mine triggering (MT) messages may include requests to pull the trigger of the ground penetrating radar sensor and release the trigger of the ground penetrating radar sensor.

As non-limiting examples, mine data (MD) messages may include data sent from the ESPM to the RIK, which may include to map value data (MV) messages, suspected mine hit (MH) messages, mine location data (ML) messages, mine sensor elevation data (ME) messages, and mine data (MM) messages.

Map value (MV) messages are used to communicate the intensity values of the GPR and EMI signal, allowing the creation of an interface map of intensity. The fields in the message may include the following data; x location of measurement, y location of measurement, intensity of GPR backscatter, intensity of EMI signal, Aided Target Recognition (ATR) algorithm output status, which is generated by a software algorithm that attempts to determine from the metal detector and ground penetrating radar signals when a mine-like object is present. The resolution at which the data point will be provided is controllable by the RIK through the mine processor parameter (MP) messages. For example, the default setting may be for a value for every 5×5 cm point, which would typically generate about 30 values per scan (i.e., data at about 10 Hz).

Suspected mine hit (MH) messages are used to communicate a suspected mine location. The fields in the message may include the following data; x location of measurement, y location of measurement, intensity of GPR backscatter and intensity of EMI signal. Once the prescreener finds a suspected mine location, it may send this string. Once this string is sent, the robot may perform the following actions:
    allow the arm to complete its current scan
    change to characterization mode, which will typically include:
    move back about 10-15 cm
    do similar scans as before, but move ahead 1 cm at a time.
    stop before the robot would be "over" the target Once a suspected mine location has been declared, the ESPM goes in to characterization mode. There are two outcomes after going into characterization mode:
   the system locates a mine, and
   the system determined that the suspected mine was not a mine.
Both of these outcomes may be encoded in the mine location (ML) messages. Once the ESPM sends a mine location (ML) message, it may perform the following actions:
   evaluate if there are other points that trigger a mine hit in the buffer
   If there are other points, send out another mine hit message
   If there are no other points, switch back to mine detection mode
   Once the ESPM is in mine characterization mode, it can either decide on its own whether it has found a mine (or no mine), or it can be forced by the RIK to declare a mine or no mine. If the RIK sends a mine search (MS:END) message, the ESPM should send a message back. The content of the mine location message is the same. However, to allow the RIK to react differently, a prefix to the message may be different.
   In the case that the ESPM determines a mine after a mine search (MS:END) message, a mine location (ML) message may include the following data; a number to indicate RIK termination (e.g., "1"), x location of the centroid of the mine, y location of the centroid of the mine, perimeter of the target (e.g., the perimeter may be defined as a radius of a circle), and confidence level. As a non-limiting example, the confidence level may be set with a number between zero and one.
   In the case that the ESPM determines a mine by itself (i.e., while the robot is still in detailed characterization mode), a mine location (ML) message may include the same data except the number at the front of the data packet will be changed (e.g., a "2" to indicate termination by the ESPM.
   In cases where no mine is detected, a mine location (ML) message may include a number designating the terminating entity (e.g., "1" for RIK, "2" for ESPM) and a designator to indicate no mine was found (e.g., "XX").
   As non-limiting examples, mine sensor elevation data (ME) messages may communicate the elevation of the sensor above the ground as estimated by the GPR data. The fields in the message may include the following data; x location of measurement, y location of measurement, and z elevation of the sensor above the ground.
   As non-limiting examples, mine data (MM) messages may communicate the about the mine sensor package and may include the following data; battery power, an indication if data is being received, and an indication of status, such as for example, calibration mode, noise cancel mode, EMI mode, quick calibration mode, and GPR training mode.
   Certain behaviors are expected both on the RIK side (in reaction to RIK bound messages) and on the ESPM side (in reaction to ESPM bound messages).
   For RIK behaviors, once the mine scanning has been initiated, the RIK will sweep the mine sensor back and forth, and move between each sweep. The distance between scans may be given in the parameter file for the RIK as a distance between scans during the detection mode (e.g., MINEDETECT_SCANDISTANCE). Once a suspected mine is found, the RIK will initiate detailed scanning behavior (i.e., second look behavior), which may include backing up a specified distance (e.g., MINEHITBACKUP) and resume scans at a different distance between scans during the characterization mode (e.g., MINECHARACT_SCANDISTANCE).
   Once a mine is declared, the RIK may perform the following behaviors; mark the mine, continue over the mine (in overpass mode), or avoid the mine (in avoidance mode).

If the RIK is marking the mine, it may take the following actions:
   Tell the ESPM to stop processing data
   maneuver the marking system to mark the mine
   Reposition the robot
   Tell the ESPM to resume processing data. At this time, the ESPM should return to characterization mode, and evaluate if there are any other possible mines in the area (which may lead to other suspected mine hit (MH) messages and mine location (ML) messages. Note that it is possible that the marking over the mine resulted in a need to do a quick calibration, which may be determined by the ESPM.
   For ESPM behaviors, the main behaviors of the ESPM are defined primarily in terms of sending data and setting parameters. Two behaviors that may need elaboration are when the ESPM finds a suspected mine and when the ESPM determines that calibration is required.
   When the ESPM finds a suspected mine, it may perform the following actions:
   Send a mine hit (MH) message
   change to mine detection mode
   if a mine is found
   provide mine location and details
   change to mine characterization mode
   evaluate if there are other suspected mines
      if there are suspected mines, send a mine hit (MH) message, resume at (1)
      if there are no suspected mines, remain in mine characterization mode
   if no mine found
   send a message saying that this was not a mine
   change to mine characterization mode
   evaluate if there are other suspected mines
      if there are suspected mines, send a mine hit (MH) message, resume at (1)
      if there are no suspected mines, remain in mine characterization mode
   The ESPM determines that a calibration is needed by analyzing the MD or GPR data and if needed may perform the following actions:
   Send a calibration request to the RIK
   Wait for the RIK to send a calibration start command
   Collect the calibration data.
   Evaluate the calibration data. In case of problems, send an appropriate message
   Although this invention has been described with reference to particular embodiments, the invention is not limited to these described embodiments. Rather, the invention is limited only by the appended claims, which include within their scope all equivalent devices or methods that operate according to the principles of the invention as described.
   What is claimed is:
   1. A method of explosive hazard detection, the method comprising:
      providing a robot intelligence kernel (RIK) including a dynamic autonomy structure with two or more autonomy levels between operator intervention in a teleoperation mode and robot initiative in an autonomous mode and for controlling operation of one or more locomotors and one or more subsurface perceptors of the robot;
      providing an explosive hazard sensor and processing module (ESPM) operating separately from the RIK, the ESPM configured to:
         perceive environmental variables indicative of a presence of an explosive hazard using the one or more subsurface perceptors;

process information from the perceiving to determine a likelihood of a presence of the explosive hazard; and
communicate with the RIK to exchange information and commands; and
autonomously modifying behavior of the robot, responsive to an indication of a detected explosive hazard from the ESPM, between:
detection of explosive hazards as part of achievement of a goal assigned by the operator;
detailed scanning and characterization of the detected explosive hazard by adjusting operation of the one or more locomotors and the one or more subsurface perceptors and processing sensed information to develop explosive hazard indication parameters; and
resuming the detection of explosive hazards after the detailed scanning and characterization.

2. The method of claim 1, wherein autonomously modifying behavior of the robot further comprises marking a location of the detected explosive hazard between the detailed scanning and characterization and the resuming the searching for explosive hazards.

3. The method of claim 1, wherein processing sensed information to develop explosive hazard indication parameters further comprises determining a centroid location of the explosive hazard, determining a perimeter of the explosive hazard, and determining a confidence level that the explosive hazard has been detected.

4. The method of claim 1, wherein communicating with the RIK to exchange information further comprises:
sending a map value message including a first location estimate and a sensed intensity estimate;
sending a suspected explosive hazard message including a second location estimate and a sensed intensity estimate responsive to a detection process by the ESPM of the suspected explosive hazard; and
sending an explosive hazard location message including a third location estimate and a confidence level estimate responsive to a characterization process by the ESPM of detailed explosive hazard information.

5. The method of claim 1, communicating with the RIK to exchange information and commands comprises:
sending ESPM bound messages from the RIK to the ESPM to set parameters of the ESPM, request operations to be performed by the ESPM, and acknowledge at least some messages from the RIK; and
sending RIK bound messages from the ESPM to the RIK to request operations to be performed by the RIK, send explosive hazard information, and acknowledge at least some messages from the ESPM.

6. A robot platform, comprising:
one or more subsurface perceptors configured to perceive environmental variables indicative of a presence of an explosive hazard;
one or more locomotors configured to provide mobility to the robot platform; and
one or more controllers configured to execute:
a robot intelligence kernel (RIK) including a dynamic autonomy structure with two or more autonomy levels between operator intervention in a teleoperation mode and robot initiative in an autonomous mode and for controlling operation of one or more locomotors and one or more subsurface perceptors; and
an explosive hazard sensor and processing module (ESPM) operating separately from the RIK, the ESPM configured to:
perceive environmental variables indicative of a presence of an explosive hazard using the one or more subsurface perceptors;
process information from the perceiving to determine a likelihood of a presence of the explosive hazard; and
communicate with the RIK to exchange information and commands; and
autonomous behavior modifications of the robot platform, responsive to an indication of a detected explosive hazard from the ESPM, between:
detection of explosive hazards as part of achievement of a goal assigned by the operator;
detailed scanning and characterization of the detected explosive hazard by adjusting operation of the one or more locomotors and the one or more subsurface perceptors and processing sensed information to develop explosive hazard indication parameters; and
resuming the detection of explosive hazards after the detailed scanning and characterization.

7. The robot platform of claim 6, wherein the one or more controllers include at least a first controller for the RIK and a second controller for the ESPM.

8. The robot platform of claim 6, wherein the one or more controllers include a single controller configured to run both the RIK and the ESPM as separate processes.

9. The robot platform of claim 6, wherein the one or more controllers are further configured to execute a process for marking a location of the detected explosive hazard between the detailed scanning and characterization and the resuming the searching for explosive hazards.

10. The robot platform of claim 6, wherein the one or more controllers are further configured to:
process sensed information to develop the explosive hazard indication parameters by determining a centroid location of the explosive hazard;
determine a perimeter of the explosive hazard; and
determine a confidence level that the explosive hazard has been detected.

11. The robot platform of claim 6, wherein the one or more controllers are further configured to communicate with the RIK to exchange information by:
sending a map value message including a first location estimate and a sensed intensity estimate;
sending a suspected explosive hazard message including a second location estimate and a sensed intensity estimate responsive to a detection process by the ESPM of the suspected explosive hazard; and
sending an explosive hazard location message including a third location estimate and a confidence level estimate responsive to a characterization process by the ESPM of detailed explosive hazard information.

12. The robot platform of claim 6, wherein the one or more controllers are further configured to facilitate communication between the ESPM and the RIK by:
sending ESPM bound messages from the RIK to the ESPM to set parameters of the ESPM, request operations to be performed by the ESPM, and acknowledge at least some messages from the RIK; and
sending RIK bound messages from the ESPM to the RIK to request operations to be performed by the RIK, send explosive hazard information, and acknowledge at least some messages from the ESPM.

13. The method of claim 1, further comprising planning a path to a goal point using a plurality of waypoints to pass over in achievement of the goal.

14. The method of claim 13, wherein autonomously modifying behavior of the robot further includes autonomously re-planning the path to the goal point with at least one new waypoint for the robot to pass over to avoid a location of the detected explosive hazard in achievement of the goal.

15. The method of claim 2, wherein marking the location of the detected explosive hazard includes at least one of physically marking the location and storing a record of the location in memory.

16. The method of claim 1, wherein the detailed scanning and characterization of the detected explosive hazard includes prescreening the sensed information in real time to trigger an event if a substantial change occurs in the sensed information indicator of a presence of an explosive hazard.

17. The robot platform of claim 6, wherein the one or more subsurface perceptors includes at least one perceptor selected from the group consisting of an electromagnetic induction (EMI) detector, a ground penetrating radar (GPR) sensor, and other sensors configured to detect an explosive hazard.

18. The robot platform of claim 17, wherein the explosive hazard sensor is configured to detect an explosive hazard selected from the group consisting of a mine, a pressure plate explosive device, an improvised explosive device, and an unexploded ordnance.

19. The robot platform of claim 6, wherein the ESPM is configured to operate in a plurality of different modes including a standby mode, a calibration mode, an explosive hazard detection mode, an explosive hazard characterization mode, and a map value mode.

20. The robot platform of claim 6, wherein the two or more autonomy levels of the RIK include a combination of at two least modes selected from the group consisting of a fully teleoperation mode, a safe mode, a shared mode, a collaborative tasking mode, and a fully autonomous mode.

* * * * *